US011853400B2

(12) United States Patent
Green et al.

(10) Patent No.: US 11,853,400 B2
(45) Date of Patent: Dec. 26, 2023

(54) DISTRIBUTED MACHINE LEARNING ENGINE

(71) Applicant: Bottomline Technologies, Inc., Portsmouth, NH (US)

(72) Inventors: Paul Green, Londonderry, NH (US); Jerzy Bala, Potomac Falls, VA (US)

(73) Assignee: Bottomline Technologies, Inc., Portsmouth, NH (US)

( * ) Notice: Subject to any disclaimer, the term of this patent is extended or adjusted under 35 U.S.C. 154(b) by 0 days.

(21) Appl. No.: 18/123,529

(22) Filed: Mar. 20, 2023

(65) Prior Publication Data
US 2023/0244758 A1 Aug. 3, 2023

Related U.S. Application Data

(63) Continuation of application No. 17/864,704, filed on Jul. 14, 2022, now Pat. No. 11,609,971, which is a
(Continued)

(51) Int. Cl.
*G06F 18/24* (2023.01)
*G06N 20/00* (2019.01)
(Continued)

(52) U.S. Cl.
CPC ...... *G06F 18/24765* (2023.01); *G06F 16/285* (2019.01); *G06F 18/2148* (2023.01);
(Continued)

(58) Field of Classification Search
CPC .... G06K 9/626; G06K 9/6253; G06K 9/6257; G06N 20/00
See application file for complete search history.

(56) References Cited

U.S. PATENT DOCUMENTS 4,575,793 A 3/1986 Morel et al.
5,228,122 A 7/1993 Cahn et al.
(Continued)

FOREIGN PATENT DOCUMENTS

EP 1211865 A2 6/2002
EP 1706960 A1 10/2006
(Continued)

OTHER PUBLICATIONS

"Distributed Mining of Classification Rules", By Cho and Wuthrich, 2002 http://www.springerlink.com/(21nnasudlakyzciv54i5kxz0)/app/home/contribution.asp?referrer-parent&backto=issue, 1,6;journal,2,3,31;linkingpublicationresults, 1:105441, 1.
(Continued)

*Primary Examiner* — Lewis G West
(74) *Attorney, Agent, or Firm* — Downs Rachlin Martin PLLC

(57) ABSTRACT

A novel distributed method for machine learning is described, where the algorithm operates on a plurality of data silos, such that the privacy of the data in each silo is maintained. In some embodiments, the attributes of the data and the features themselves are kept private within the data silos. The method includes a distributed learning algorithm whereby a plurality of data spaces are co-populated with artificial, evenly distributed data, and then the data spaces are carved into smaller portions whereupon the number of real and artificial data points are compared. Through an iterative process, clusters having less than evenly distributed real data are discarded. A plurality of final quality control measurements are used to merge clusters that are too similar to be meaningful. These distributed quality control measures are then combined from each of the data silos to derive an overall quality control metric.

20 Claims, 14 Drawing Sheets

Related U.S. Application Data continuation of application No. 16/355,985, filed on Mar. 18, 2019, now Pat. No. 11,416,713.

(51) Int. Cl.
  *G06F 18/40* (2023.01)
  *G06F 18/214* (2023.01)
  *G06F 16/28* (2019.01)
  *G06N 5/025* (2023.01)

(52) U.S. Cl.
  CPC ............ *G06F 18/40* (2023.01); *G06N 5/025* (2013.01); *G06N 20/00* (2019.01)

(56) References Cited

U.S. PATENT DOCUMENTS

| | | |
|---|---|---|
| 5,559,961 A | 9/1996 | Blonder |
| 5,600,735 A | 2/1997 | Seybold |
| 5,600,835 A | 2/1997 | Garland et al. |
| 5,634,008 A | 5/1997 | Gaffaney et al. |
| 5,644,717 A | 7/1997 | Clark |
| 5,790,798 A | 8/1998 | Beckett et al. |
| 5,845,369 A | 12/1998 | Dunchock |
| 5,912,669 A | 6/1999 | Hsia |
| 5,961,592 A | 10/1999 | Hsia |
| 5,970,482 A | 10/1999 | Pham et al. |
| 6,044,401 A | 3/2000 | Harvey |
| 6,192,411 B1 | 2/2001 | Chan et al. |
| 6,205,416 B1 | 3/2001 | Butts et al. |
| 6,256,737 B1 | 7/2001 | Bianco et al. |
| 6,523,016 B1 | 2/2003 | Michalski |
| 6,651,099 B1 | 11/2003 | Dietz et al. |
| 6,675,164 B2 | 1/2004 | Kamath et al. |
| 6,687,693 B2 * | 2/2004 | Cereghini ............ G06F 16/2465 707/602 |
| 6,708,163 B1 | 3/2004 | Kargupta et al. |
| 6,801,190 B1 | 10/2004 | Robinson et al. |
| 6,845,369 B1 | 1/2005 | Rodenburg |
| 7,092,941 B1 | 8/2006 | Campos |
| 7,174,462 B2 | 2/2007 | Pering et al. |
| 7,308,436 B2 | 12/2007 | Bala et al. |
| 7,415,509 B1 | 8/2008 | Kaltenmark et al. |
| 7,730,521 B1 | 6/2010 | Thesayi et al. |
| 7,822,598 B2 | 10/2010 | Carus et al. |
| 7,831,703 B2 | 11/2010 | Krelbaum et al. |
| 7,860,783 B2 | 12/2010 | Yang et al. |
| 7,992,202 B2 | 8/2011 | Won et al. |
| 8,229,875 B2 | 7/2012 | Roychowdhury |
| 8,229,876 B2 | 7/2012 | Roychowdhury |
| 8,392,975 B1 | 3/2013 | Raghunath |
| 8,429,745 B1 | 4/2013 | Casaburi et al. |
| 8,433,791 B2 | 4/2013 | Krelbaum et al. |
| 8,515,862 B2 | 8/2013 | Zhang et al. |
| 8,638,939 B1 | 1/2014 | Casey et al. |
| 8,650,624 B2 | 2/2014 | Griffin et al. |
| 8,776,213 B2 | 7/2014 | McLaughlin et al. |
| 8,844,059 B1 | 9/2014 | Manmohan |
| 8,881,005 B2 | 11/2014 | Al et al. |
| 9,015,036 B2 | 4/2015 | Karov et al. |
| 9,489,627 B2 * | 11/2016 | Bala .................. G16B 40/30 |
| 9,529,678 B2 | 12/2016 | Krelbaum et al. |
| 9,537,848 B2 | 1/2017 | McLaughlin et al. |
| 9,607,103 B2 | 3/2017 | Anderson |
| 9,667,609 B2 | 5/2017 | McLaughlin et al. |
| 9,691,085 B2 | 6/2017 | Scheidelman |
| 10,037,533 B2 | 7/2018 | Caldera |
| 10,152,680 B1 | 12/2018 | Myrick et al. |
| 10,235,356 B2 | 3/2019 | Amend et al. |
| 10,242,258 B2 | 3/2019 | Guo et al. |
| 10,320,800 B2 | 6/2019 | Guo et al. |
| 10,402,817 B1 | 9/2019 | Benkreira et al. |
| 10,414,197 B2 | 9/2019 | Jesurum |
| 10,440,015 B1 | 10/2019 | Pham et al. |
| 10,467,631 B2 | 11/2019 | Dhurandhar et al. |
| 10,510,083 B1 | 12/2019 | Vukich et al. |
| 10,511,605 B2 | 12/2019 | Ramberg et al. |
| 10,523,681 B1 | 12/2019 | Bulgakov et al. |
| 10,552,837 B2 | 2/2020 | Jia et al. |
| 10,552,841 B1 | 2/2020 | Dixit |
| 10,607,008 B2 | 3/2020 | Byrne et al. |
| 10,607,228 B1 * | 3/2020 | Gai .................. G06N 5/046 |
| 10,621,587 B2 | 4/2020 | Binns et al. |
| 10,699,075 B2 | 6/2020 | Amend et al. |
| 10,824,809 B2 | 11/2020 | Kutsch et al. |
| 11,003,999 B1 * | 5/2021 | Gil .................. G06Q 40/03 |
| 11,042,555 B1 | 6/2021 | Kane et al. |
| 11,194,846 B2 * | 12/2021 | Stenneth ............ G01C 21/3815 |
| 11,321,330 B1 * | 5/2022 | Pandis ............... G06F 16/2471 |
| 11,323,513 B1 * | 5/2022 | Vibhor .................. G06F 16/178 |
| 2002/0019945 A1 | 2/2002 | Houston et al. |
| 2002/0056043 A1 | 5/2002 | Glass |
| 2002/0065938 A1 | 5/2002 | Jungck et al. |
| 2002/0080123 A1 | 6/2002 | Kennedy et al. |
| 2002/0099649 A1 | 7/2002 | Lee et al. |
| 2002/0163934 A1 | 11/2002 | Moore et al. |
| 2002/0194159 A1 * | 12/2002 | Kamath .............. G06F 16/2465 |
| 2003/0041042 A1 * | 2/2003 | Cohen .................... G06N 3/126 706/45 |
| 2003/0083764 A1 | 5/2003 | Hong |
| 2003/0110394 A1 | 6/2003 | Sharp et al. |
| 2003/0135612 A1 | 7/2003 | Huntington et al. |
| 2003/0212629 A1 * | 11/2003 | King ........................ G07F 7/08 705/39 |
| 2003/0233305 A1 * | 12/2003 | Solomon ................ G06Q 30/06 705/37 |
| 2004/0034666 A1 | 2/2004 | Chen |
| 2004/0186882 A1 | 9/2004 | Ting |
| 2004/0193512 A1 | 9/2004 | Gobin et al. |
| 2005/0021650 A1 | 1/2005 | Gusler et al. |
| 2005/0154692 A1 | 1/2005 | Jacobsen et al. |
| 2005/0081158 A1 | 4/2005 | Hwang |
| 2005/0177483 A1 | 8/2005 | Napier et al. |
| 2006/0101048 A1 | 5/2006 | Mazzagatti et al. |
| 2006/0155751 A1 | 7/2006 | Geshwind et al. |
| 2006/0190310 A1 | 8/2006 | Gudia et al. |
| 2006/0212270 A1 | 9/2006 | Shiu et al. |
| 2007/0277224 A1 | 11/2007 | Osborn et al. |
| 2008/0028446 A1 * | 1/2008 | Burgoyne ........... H04L 63/0428 726/6 |
| 2008/0104007 A1 * | 5/2008 | Bala .................. G06F 18/24323 706/59 |
| 2009/0059793 A1 | 3/2009 | Greenberg |
| 2009/0094677 A1 | 4/2009 | Pietraszek et al. |
| 2009/0140838 A1 | 6/2009 | Newman et al. |
| 2009/0174667 A1 | 7/2009 | Kocienda et al. |
| 2009/0201257 A1 | 8/2009 | Saitoh et al. |
| 2009/0202153 A1 | 8/2009 | Cortopassi et al. |
| 2009/0307176 A1 | 12/2009 | Jeong et al. |
| 2009/0313693 A1 | 12/2009 | Rogers |
| 2010/0066540 A1 | 3/2010 | Theobald et al. |
| 2010/0130181 A1 | 5/2010 | Won |
| 2010/0169958 A1 | 7/2010 | Werner et al. |
| 2010/0225443 A1 | 9/2010 | Bayram et al. |
| 2011/0055907 A1 | 3/2011 | Narasimhan et al. |
| 2011/0070864 A1 | 3/2011 | Karam et al. |
| 2011/0082911 A1 | 4/2011 | Agnoni et al. |
| 2011/0145587 A1 | 6/2011 | Park |
| 2011/0251951 A1 | 10/2011 | Kolkowitz et al. |
| 2011/0298753 A1 | 12/2011 | Chuang et al. |
| 2012/0041683 A1 | 2/2012 | Vaske et al. |
| 2012/0124662 A1 | 5/2012 | Baca et al. |
| 2012/0127102 A1 | 5/2012 | Uenohara et al. |
| 2012/0151553 A1 | 6/2012 | Burgess et al. |
| 2013/0071816 A1 | 3/2013 | Singh et al. |
| 2013/0117246 A1 | 5/2013 | Cabaniols et al. |
| 2013/0231974 A1 | 9/2013 | Harris et al. |
| 2013/0339141 A1 | 12/2013 | Stibel et al. |
| 2014/0006347 A1 | 1/2014 | Qureshi et al. |
| 2014/0067656 A1 | 3/2014 | Cohen et al. |
| 2014/0149130 A1 | 5/2014 | Getchius |
| 2014/0366159 A1 | 12/2014 | Cohen |
| 2015/0039473 A1 | 2/2015 | Hu et al. |
| 2015/0220509 A1 | 8/2015 | Karov Zangvil et al. |
| 2015/0264573 A1 | 9/2015 | Giordano et al. |

(56) References Cited

U.S. PATENT DOCUMENTS

| | | | |
|---|---|---|---|
| 2015/0348041 | A1 | 12/2015 | Campbell et al. |
| 2016/0041984 | A1 | 2/2016 | Kaneda et al. |
| 2016/0352759 | A1 | 12/2016 | Zhai |
| 2017/0039219 | A1 | 2/2017 | Acharya et al. |
| 2017/0154382 | A1 | 6/2017 | McLaughlin et al. |
| 2017/0163664 | A1 | 6/2017 | Nagalla et al. |
| 2017/0177743 | A1 | 6/2017 | Bhattacharjee et al. |
| 2017/0300911 | A1 | 10/2017 | Alnajem |
| 2018/0107944 | A1 | 4/2018 | Lin et al. |
| 2018/0342328 | A1* | 11/2018 | Chan .................... G06F 16/951 |
| 2018/0349924 | A1 | 12/2018 | Shah et al. |
| 2019/0197189 | A1 | 6/2019 | Studnicka |
| 2019/0205977 | A1* | 7/2019 | Way ....................... G06N 20/00 |
| 2019/0228411 | A1 | 7/2019 | Hernandez-Ellsworth et al. |
| 2019/0347281 | A1 | 11/2019 | Natterer |
| 2019/0349371 | A1 | 11/2019 | Smith et al. |
| 2019/0373001 | A1 | 12/2019 | Deeb et al. |
| 2019/0392487 | A1* | 12/2019 | Duke .................. G06V 30/413 |
| 2020/0019964 | A1 | 1/2020 | Miller et al. |
| 2020/0117800 | A1 | 4/2020 | Ramberg et al. |
| 2021/0049326 | A1 | 2/2021 | Amend et al. |
| 2021/0224663 | A1* | 7/2021 | Gil ........................ G06Q 40/02 |
| 2022/0156526 | A1* | 5/2022 | Chen ..................... G06V 10/30 |

FOREIGN PATENT DOCUMENTS

| | | |
|---|---|---|
| EP | 2653982 A1 | 10/2013 |
| EP | 2636149 A4 | 10/2016 |
| IL | 176551 A | 9/2012 |
| IN | 219405 | 3/2007 |
| KR | 10-0723738 B1 | 5/2007 |
| TW | 201723907 A | 7/2017 |
| WO | 01/25914 A2 | 4/2001 |
| WO | 02/87124 A1 | 10/2002 |
| WO | 2002/100039 A2 | 12/2002 |
| WO | 03/73724 A2 | 9/2003 |
| WO | 2005/067209 A1 | 7/2005 |
| WO | 2012/061701 A1 | 5/2012 |
| WO | 2014/145395 A2 | 9/2014 |
| WO | 2017/096206 A1 | 6/2017 |
| WO | 2017/209799 A1 | 12/2017 |

OTHER PUBLICATIONS

Bansal, Nikhil, Avrim Blum, and Shuchi Chawla. "Correlation clustering." Machine Learning 56.1-3 (2004): 89-113.

Finley, Thomas, and Thorsten Joachims. "Supervised clustering with support vector machines." Proceedings of the 22nd international conference on Machine learning, ACM, 2005.

Meia et al., Comparing clusterings—an information based distance, Journal of Multivariate Analysis 98 (2007) 873-895.

Kim, Jinkyu, et al, Collaboratice Analytics for Data Silos, Jun. 2016, IEEE Xplore, pp. 743-754 (year: 2016).

Appaloosa Store, "Siring Similarity Algorithms Compared", Apr. 5, 2018, webpage downloaded on Oct. 20, 2020 rom https://medium.com/@appaloosastore/string-similarity-algorithms-compared-3f7b4d12f0ff.

Banon, Shay, "Geo Location and Search", elastic blog post, Aug. 16, 2010, webpage found at https://www.elastic.co/blog/geo-location-and-search on Oct. 15, 2019.

Bottomline Technologies, Bottomline Cyber Fraud & Risk Management:Secure Payments, marketing brochure.

Brasetvik, Alex, "Elasticsearch from the Bottom up, Part 1", Elastic, Sep. 16, 2013. Webpage found at https://www.elastic.co/blog/found-elasticsearch-from-the-bottom-up on Jun. 17, 2019.

Co-pending U.S. Appl. No. 13/135,507, filed Jul. 7, 2011.

Experian, "Fuzzy address searching", webpage downloaded from https://www.edq.com/glossary/fuzzy-address-searching/ on Oct. 8, 2019.

Fenz, Dustin, et al., "Efficient Similarity Search in Very Large String Sets", conference paper, Jun. 2012.

G. Kou, Y. Peng, Y. Shi, M. Wise, W. Xu, Discovering credit cardholders behavior by multiple criteria linear programming, Annals of Operations Research 135, (2005) 261-274.

Haydn Shaughnessy, Solving the $190 billion Annual Fraud Problem: More on Jumio, Forbes, Mar. 24, 2011.

IdentityMing, Accelerated Fintech Compliance and Powerful Online Fraud Prevention Tools, website found at https://identitymindglobal.com/momentum/ on Dec. 12, 2018.

International Search Report and Written Opinion received for PCT Patent Application No. PCT/IL05/000027, dated Jun. 2, 2005, 8 pages.

International Search Report and Written Opinion received for PCT Patent Application No. PCT/US17/13148, dated May 19, 2017, 11 pages.

International Search Report for corresponding International Application No. PCT/US2016/064689 dated Feb. 22, 2017.

Jeremy Olshan, How my bank tracked me to catch a thief, MarketWatch, Apr. 18, 2015.

Mitchell, Stuart, et al., "pulp Documentation", Release 1.4.6, Jan. 27, 2010.

Postel et al.; "Telnet Protocol Specification" RFC 854; entered into the case on Apr. 18, 2013.

RodOn, "location extraction with fuzzy matching capabilities", Blog post on StackOverflow.com, Jul. 8, 2014, webpage downloaded from https://stackoverflow.com/questions/24622693/location-extraction-with-fuzzy-matching-capabilities on Oct. 8, 2019.

Rosette Text Analytics, "An Overview of Fuzzy Name Matching Techniques", Blog, Dec. 12, 2017, webpage downloaded from https://www.rosette.com/blog/overview-fuzzy-name-matching-techniques/ on Oct. 15, 2019.

Samaneh Sorournejad, Zahra Zojaji, Reza Ebrahimi Atani, Amir Hassan Monadjemi, "A Survey of Credit Card Fraud Detection Techniques: Data and Technique Oriented Perspective", 2016.

Schulz, Klaus and Stoyan Mihov, "Fast String Correction with Levenshtein-Automata", IJDAR (2002) 5: 67. https://doi.org/10.1007/s10032-002-0082-8.

The Telnet Protocol Microsoft Knowledgebase; entered into the case on Apr. 18, 2013.

Vogler, Raffael, "Comparison of Siring Distance Algorithms", Aug. 21, 2013, webpage downloaded on Oct. 20, 2020 from https://www.joyofdala.de/blog/comparison-of-string-distance-algorithms.

Wikil Kwak, Yong Shi, John J. Cheh, and Heeseok Lee, "Multiple Criteria Linear Programming Data Mining Approach: An Application for Bankruptcy Prediction", : Data Mining and Knowledge Management, Chinese Academy of Sciences Symposium, 2004, LNAI 3327, pp. 164-173, 2004.

Wikipedia, "Autoencoder", web page downloaded from http://en.wikipedia.org/wiki/Autoencoder on Dec. 18, 2020.

Wikipedia, "Damerau-Levenshtein distance", webpage downloaded on Oct. 20, 2020 from https://en.wikipedia.org/wiki/Damerau-Levenshtein_distance.

Written Opinion of the International Searching authority for corresponding International Application No. PCT/US2016/064689 dated Feb. 22, 2017.

* cited by examiner

| ID 801 | BANK 802 | | CREDIT AGENCY 803 | | REGISTRY OF DEEDS 804 | |
|---|---|---|---|---|---|---|
| SSN | Loan Default | Amount Borrowed | Credit Score | Total Debt | Home Ownership | Home Value |
| 012-34-5678 | − | $ 10,000 | 575 | $ 500,000 | Y | $ 650,000 |
| 012-34-5679 | + | $ 12,000 | 829 | $ − | Y | $ 750,000 |
| 012-34-5670 | − | $ 15,000 | 700 | $ 30,000 | N | $ 50,000 |
| 012-34-5671 | − | $ 11,000 | 600 | $ 400,000 | Y | $ 350,000 |
| 012-34-5672 | + | $ 27,000 | 625 | $ 30,000 | N | $ − |
| 012-34-5673 | + | $ 9,000 | 715 | $ 900,000 | Y | $ 1,250,000 |
| 012-34-5674 | + | $ 13,000 | 735 | $ 125,000 | Y | $ 500,000 |
| 012-34-5675 | + | $ 15,000 | 800 | $ 10,000 | N | $ − |
| 012-34-5676 | + | $ 25,000 | 690 | $ 295,000 | Y | $ 400,000 |
| 012-34-5677 | + | $ 33,000 | 825 | $ 85,000 | Y | $ 275,000 |

*Figure 8*

DISTRIBUTED MACHINE LEARNING ENGINE

BACKGROUND

PRIOR APPLICATION

This application is a continuation patent application from U.S. patent application Ser. No. 17/864,704, "Machine Learning Engine using a Distributed Predictive Analytics Data Set", filed Jul. 14, 2022, by Paul Green and Jerzy Bala, now U.S. Pat. No. 11,609,971, issued on Mar. 20, 2023, said application is incorporated herein by reference in its entirety. U.S. patent application Ser. No. 17/864,704 is a continuation patent application from U.S. patent application Ser. No. 16/355,985, "Distributed Predictive Analytics Data Set", filed Mar. 18, 2019, by Jerzy Bala and Paul Green, now U.S. Pat. No. 11,416,713, issued on Aug. 16, 2022, said application is incorporated herein by reference in its entirety.

TECHNICAL FIELD

The system, apparatuses, and methods described herein generally relate to machine learning techniques, and, in particular, to predictive analytics solutions using distributed data.

DESCRIPTION OF THE RELATED ART

Typically, data sets that are used in predictive analytics solutions (PA) are represented by a category of instances where each instance stores the values of several attributes/features. Most of the existing predictive analytics tools (e.g., the ones using the knowledge discovery/data mining/predictive analytics techniques) assume that all the data shall be collected in a single host machine and represented by a homogeneous data and metadata structure.

In computing, extract, transform, load (ETL) is the general procedure of copying data from one or more sources into a destination system which represents the data differently from the source(s). The term comes from the three basic steps needed: extracting (selecting and exporting) data from the source, transforming the way the data is represented to the form expected by the destination, and loading (reading or importing) the transformed data into the destination system.

As we experience exponential growth in data, this assumption requires the definition and implementation of complex ETL processes, and in many siloed data-collecting scenarios it is technically infeasible and/or cost-prohibiting. Data silos were created to address specific business objectives, and as such, most of the enterprise data warehousing systems are challenged by the inability to aggregate data to support predictive analytics-based decision-making.

The distributed nature of data exhibits two types of data fragmentation (see FIG. 6A and FIG. 6B).

Horizontal fragmentation wherein subsets of instances 611-619 are stored at different sites 610, 620, 630 (FIG. 6A).

Vertical fragmentation wherein subsets of attributes 651-659 of instances are stored at different sites 650, 660, 670 (FIG. 6B).

In addition, almost all predictive analytics algorithms require the data sets to be stored entirely in main memory. If the computational cost exceeds the main memory, then the algorithm is challenged by the potential unfeasibility of completion due to memory restrictions or long runtimes. However, with data fragments as units of distribution, the analysis task can be divided into several sub-tasks that operate together in parallel. The distributed data analysis approach would make a better exploitation of the available computing networked infrastructure.

Following the above observations, there have been different, mostly academic research and development-oriented efforts (as such solutions are not available in open source repositories) directed towards data analysis from distributed data sources. The problem with most of these efforts is that although they allow the data sources to be distributed over a network of data silos, they assume that the distributed data of comment entities is defined over the same set of features. In other words, they assume that the data is partitioned horizontally (FIG. 6A). In order to fully take advantage of all the available data, the predictive analytics tools must provide for algorithms to handle the data characterized by:

Spatial (or logical) distribution of data silos,
Complexity and multi-feature representations, and
Vertical partitioning/distribution of feature sets.

The Distributed DensiCube modeler and scorer extend the same predictive analytics algorithms that have been already implemented (i.e., Bottomline's DensiCube solution, as partially described in the U.S. Pat. No. 9,489,627, issued to Jerzy Bala on Nov. 8, 2016, said patent incorporated herein by reference in its entirety) to enable their execution in the distributed data siloed environments. The algorithm described in U.S. Pat. No. 9,489,627, distributed, is one possible embodiment of the inventions herein. Other machine learning algorithms could also be used.

The immediate benefits of the Distributed DensiCube include:

Privacy-preserving of the data assets in the model generation and prediction modes of operation.

Cost reduction of implementing complex ETL processes and data warehousing in general.

Capability to use Distributed DensiCube for non-distributed predictive analytics in the parallel computational mode (i.e., executing the predictive analytics algorithms on distributed computing platforms) to support computationally cost-effective model generation.

Capability to Distributed DensiCube for unsupervised learning to support outlier detection (e.g., fraud detection from distributed data sources).

Capability of predictive analytics solutions to operate and react in real-time on a low-level transactional streaming data representation while not requiring data aggregation.

The Distributed DensiCube approach represents a paradigm shift of moving from the currently predominant Data Centric approaches to predictive analytics, i.e., approaches that transform, integrate, and push data from distributed silos to predictive analytics agents, to the future Decision Centric (Predictive Analytics Bot Agent-based approaches, i.e., approaches that push predictive analytics agents to the data locations and by collaborating support decision-making in the distributed data environments).

Collaborating Predictive Analytics Bot Agents can facilitate numerous opportunities for enterprise data warehousing to provide faster, more predictive/prescriptive, and time and cost-saving decision-making solutions for their customers.

Examples of the use of this in banking applications where each branch has its own database 610, 620, 630 of customers 611-619. For privacy, security, and performance reasons, the data is kept in the branches, but the bank needs to use the data from each branch for its machine learning algorithms.

The predictive analytics data needs to be aggregated into a model without transferring the data to a central location.

Similarly, when opening a new account at a bank, machine learning models need to be built for predictive analytics. The data for the customer 802 may be in the branch database for the customer name and address, the customer's credit history may be in a separate database with a credit bureau (such as Equifax, Experian, and TransUnion) 803, and the customers real estate holdings and mortgages may be in a third database at the registry of deeds 804 (see FIG. 8 for example). The predictive analytics model needs to be built using data from each of these databases without being able to aggregate the data at a single location.

There is a need in the industry for the building of machine learning models using distributed data without moving the data.

BRIEF SUMMARY OF THE INVENTION

A distributed method for creating a machine learning rule set is described herein. The method is made up of the steps of (1) preparing, on a computer, a set of data identifiers to identify the data elements for training the machine learning rule set, (2) sending the set of data identifiers to a plurality of data silos; (3) executing, on each data silo, a machine learning algorithm using the data elements and the data identifiers on the data silo to derive a silo specific rule set; (4) calculating, on each data silo, a quality control metric on the silo specific rule set; (5) sending the quality control metric from each data silo to the computer; and (5) combining, on the computer, the quality control metrics from each data silo into a combined quality control metric.

In some embodiments, the quality control metric is an F-Score. The combined quality control metric could use a weighted algorithm. The data silos could be made up of a special-purpose processor and a special-purpose storage facility.

In some embodiments, the method also includes sending the silo-specific rule sets to the computer from at least one of the plurality of data silos. And the method could further include sending a plurality of silo-specific rule sets and quality control metrics associated with the silo-specific rule sets, from the data silos to the computer. Yet in other embodiments, the silo-specific rule sets are not returned to the computer. In some cases, a set of training results are sent with the identifiers to the plurality of data silos from the computer. The machine learning algorithm could create a test rule by adding a condition, calculating a test quality metric, and saving the test rule and test quality metric if the quality metric is better than previously saved test quality metrics. In some cases, the condition could be a range locating clusters of data.

A distributed system for creating a machine learning rule set is also described herein. The system is made up of a computer, a network, and a plurality of data silos. The computer executes software to prepare a set of data identifiers to identify data elements in a plurality of data silos. The network is connected to the computer and the data silos and sends data between them. The plurality of data silos each independently executes machine learning software to create a silo-specific rule set based on the data identifiers and silo-specific data elements, and calculate silo-specific quality control metrics for the silo-specific rule set, and the data silos return the silo-specific quality control metrics to the computer. The computer executes software to combine the quality control metrics from each data silo into a combined quality control metric.

A distributed method for creating a machine learning rule set is also described here, where the method is made up of the following steps. First of all, preparing, on a computer, a set of data identifiers to identify the data elements representing similar events for training the machine learning rule set. Next, sending the set of data identifiers to a plurality of data silos. Then, receiving a quality control metric from each data silo, where the quality control metric from each data silo represents the quality control metric calculated using a silo-specific rule set that was derived from a machine learning algorithm using the data elements and the data identifiers on the data silo. Finally, combining the quality control metrics from each data silo into a combined quality control metric.

In addition, non-transitory computer-readable media is described that is programmed to prepare, on a computer, a set of data identifiers to identify the data elements representing similar events for training the machine learning rule set. The media is further programmed to send the set of data identifiers to a plurality of data silos, and receive a quality control metric from each data silo. The program also combines the quality control metrics from each data silo into a combined quality control metric. The quality control metric from each data silo represents the quality control metric calculated using a silo-specific rule set that was derived from a machine learning algorithm using the data elements and the data identifiers on the data silo.

In some aspects, the techniques described herein relate to a machine learning apparatus including: a first data storage device including a first distributed data set; a first network connector connected to a network, the first network connector in communications with a second network connector on a second data storage device on a machine learning server, the second data storage device including a second distributed data set; a model orchestrator, stored in the first data storage device and executing on the machine learning apparatus, the model orchestrator programmed to publish a set of data identifiers including data elements and data features, and programmed to send the set of the data identifiers through the first network connector to the second network connector to a second prediction manager executing on the machine learning server; a first prediction manager connected to the first data storage device programmed to receive the set of the data identifiers from the model orchestrator and to calculate a first quality control metric and a first rule set using a first machine learning algorithm on the first distributed data set; a prediction orchestrator programmed to receive the first quality control metric and the first rule set from the first prediction manager and to receive from the second prediction manager a second quality control metric and a second rule set determined from the second distributed data set; and the prediction orchestrator further programmed to combine the first rule set and the second rule set into a common rule set and to combine the first quality control metric and the second quality control metric into a combined quality control metric.

In some aspects, the techniques described herein relate to a machine learning apparatus further including a data set template, stored in the first data storage device, that contains a definition of the first distributed data set and the second distributed data set.

In some aspects, the techniques described herein relate to a machine learning apparatus wherein the model orchestrator publishes the data set template.

In some aspects, the techniques described herein relate to a machine learning apparatus wherein the combined quality control metric uses a weighted algorithm.

In some aspects, the techniques described herein relate to a machine learning apparatus wherein the combined quality control metric is an F-score.

In some aspects, the techniques described herein relate to a machine learning apparatus wherein the network is the Internet.

In some aspects, the techniques described herein relate to a machine learning apparatus wherein the network is a local area network.

In some aspects, the techniques described herein relate to a machine learning apparatus wherein the first machine learning algorithm creates a test rule by adding a condition, calculating a test quality metric, and saving the test rule and the test quality metric if the test quality metric is better than previously saved test quality metrics.

In some aspects, the techniques described herein relate to a machine learning apparatus wherein the condition is a range locating clusters of data.

In some aspects, the techniques described herein relate to a machine learning apparatus wherein the second distributed data set is kept private from the machine learning apparatus.

In some aspects, the techniques described herein relate to a machine learning method including: connecting a machine learning apparatus, including a first distributed data set stored on a first data storage device with a second data storage device on a machine learning server, the second data storage device including a second distributed data set; publishing, by a model orchestrator on the machine learning apparatus, a set of data identifiers including data elements and data features; sending, by the model orchestrator, the set of the data identifiers to a second prediction manager on the machine learning server over a network; receiving, by a first prediction manager on the machine learning apparatus, the set of the data identifiers from the model orchestrator; calculating, by the first prediction manager, a first quality control metric and a first rule set using a first machine learning algorithm on the first distributed data set; receiving, by a prediction orchestrator, the first quality control metric and the first rule set from the first prediction manager; receiving, by the prediction orchestrator from the second prediction manager, a second quality control metric and a second rule set as determined from the second distributed data set; combining, by the prediction orchestrator the first rule set and the second rule set into a common rule set; and combining, by the prediction orchestrator, the first quality control metric and the second quality control metric into a combined quality control metric.

In some aspects, the techniques described herein relate to a machine learning method further including creating a data set template, stored in the first data storage device, that contains a definition of the first distributed data set and the second distributed data set.

In some aspects, the techniques described herein relate to a machine learning method further including publishing, by the model orchestrator, the data set template.

In some aspects, the techniques described herein relate to a machine learning method wherein the combined quality control metric uses a weighted algorithm.

In some aspects, the techniques described herein relate to a machine learning method wherein the combined quality control metric is an F-score.

In some aspects, the techniques described herein relate to a machine learning method wherein the network is the Internet.

In some aspects, the techniques described herein relate to a machine learning method wherein the network is a local area network.

In some aspects, the techniques described herein relate to a machine learning method further including creating, by the first machine learning algorithm, a test rule by adding a condition, calculating a test quality metric, and saving the test rule and the test quality metric if the test quality metric is better than previously saved test quality metrics.

In some aspects, the techniques described herein relate to a machine learning method wherein the condition is a range locating clusters of data.

In some aspects, the techniques described herein relate to a machine learning method wherein the second distributed data set is kept private from the machine learning apparatus.

BRIEF DESCRIPTION OF THE DRAWINGS

FIG. 8 is a view of a database distributed over three servers.

DETAILED DESCRIPTION

The following description outlines several possible embodiments to create models using distributed data. The Distributed DensiCube modeler and scorer described below extend the predictive analytic algorithms that are described in U.S. Pat. 9,489,627 to extend their execution in distributed data environments and into quality analytics. The rule learning algorithm for DensiCube is briefly described below. But the DensiCube machine learning algorithm is only one embodiment of the inventions herein. Other machine learning algorithms could also be used.

Rule Learning Algorithm

Figure 1:
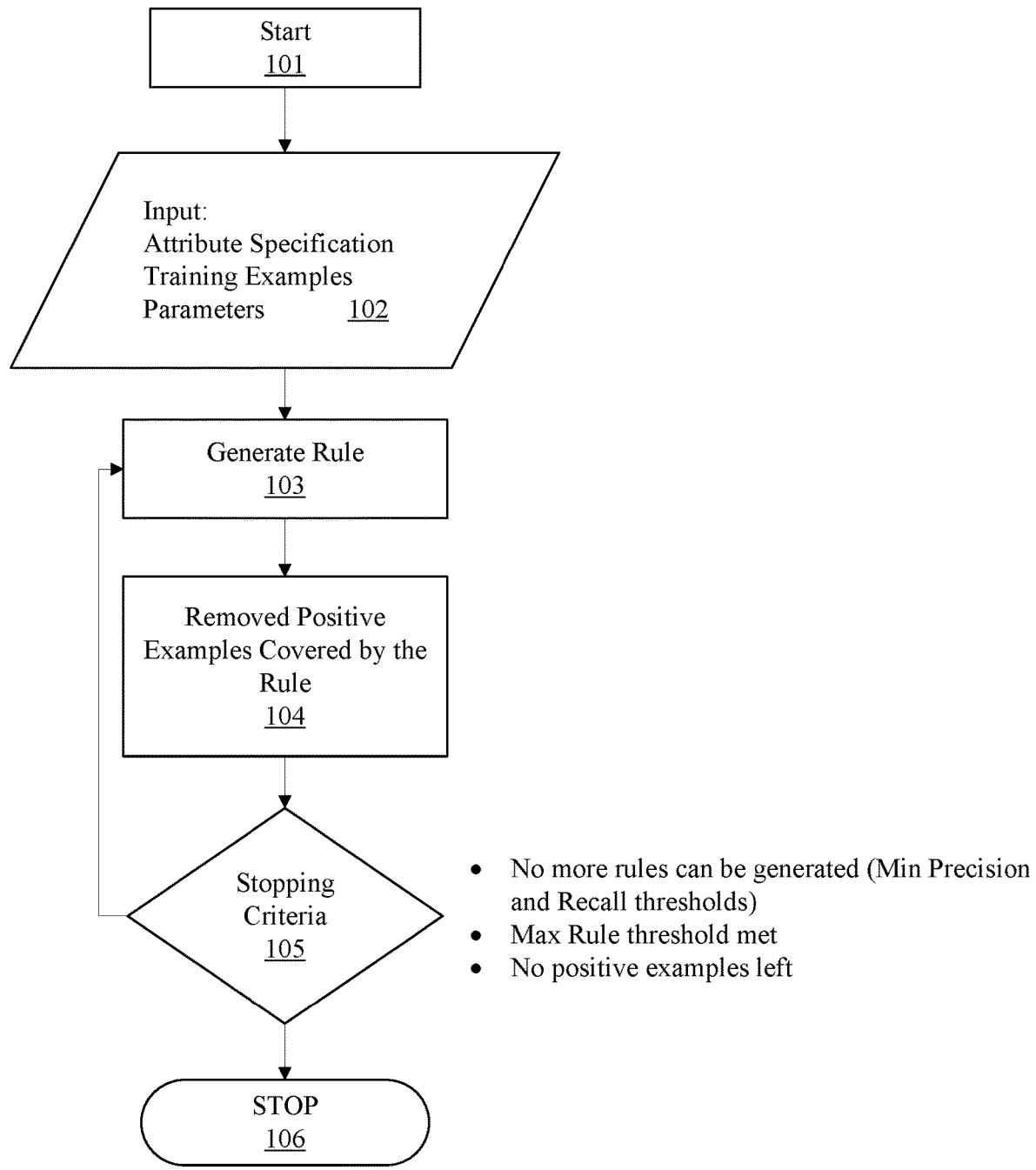
FIG. 1 is a flowchart showing rule generation.

The rule learning algorithm induces a set of rules. A rule itself is a conjunction of conditions, each for one attribute. A condition is a relational expression in the form:

$$A=V,$$

where A is an attribute and V is a nominal value for a symbolic attribute or an interval for a numeric attribute. The rule induction algorithm allows for two important learning parameters 102: minimum recall and minimum precision. More specifically, rules generated by the algorithm must satisfy the minimum recall and minimum precision requirements 105 as set by these parameters 102. The algorithm repeats the process of learning a rule 103 for the target class and removing all target class examples covered by the rule 104 until no rule can be generated to satisfy the minimum recall and minimum precision requirements 105 (FIG. 1). In the distributed DensiCube algorithm, the removal of the positive examples covered by the rule is done in parallel at each of the distributed servers that hold the data.

Figure 2:
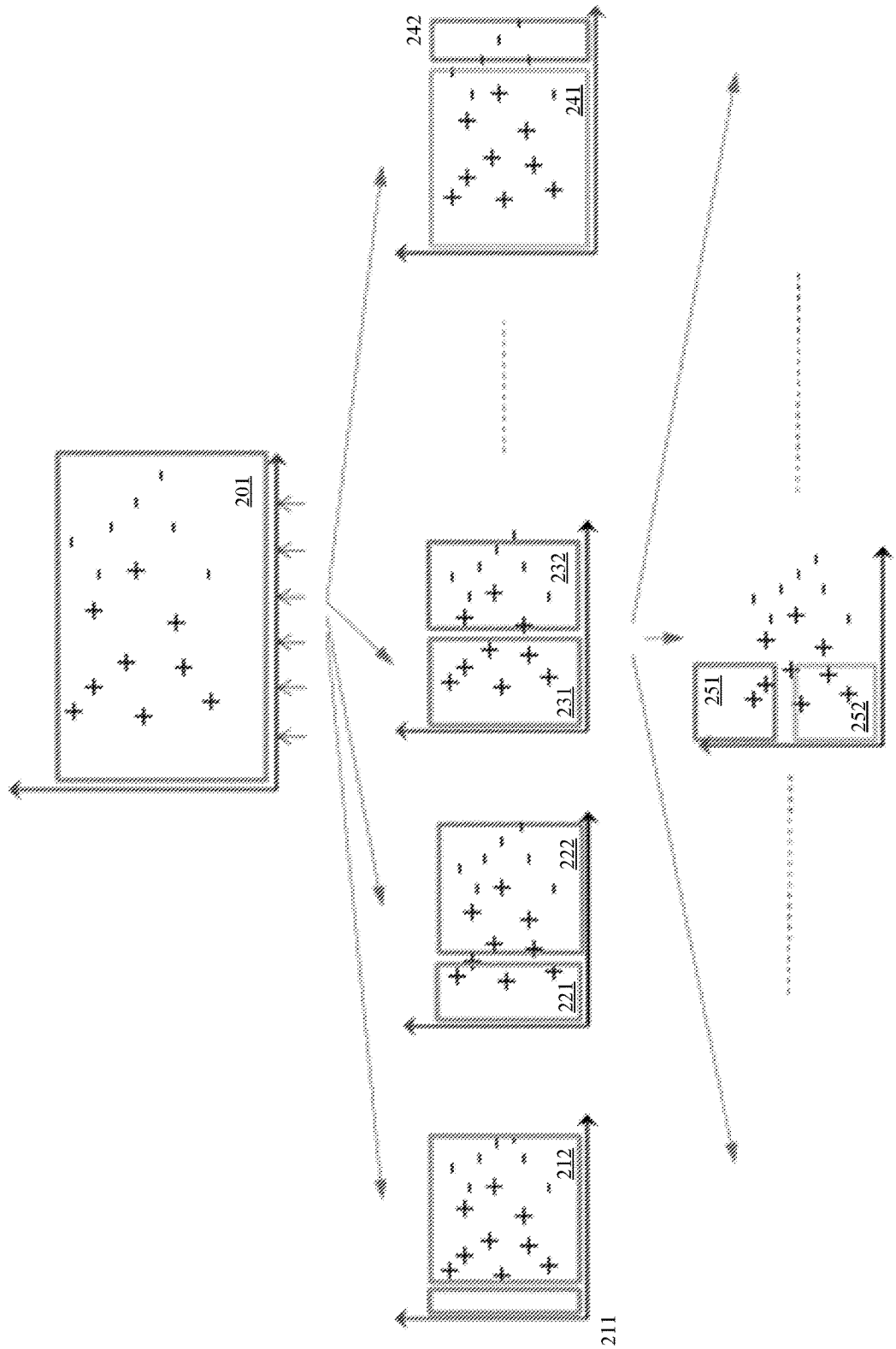
FIG. 2 shows a K-beam search based on rule specialization.

In learning a rule, as seen in FIG. 2, the algorithm starts with the most general rule 201, which covers the entire feature space (all examples both positive and negative) and then conducts a general-to-specific beam search. At each step of the search, the algorithm maintains a set of k best rules (rules with the largest F-measure scores), where k is a user-defined parameter. A smaller k translates into a smaller search space, hence a faster search. Each of the best rules is specialized by either adding a new condition or reducing the interval of a condition of a numeric attribute. This search process repeats until the recalls of all rules are smaller than the minimum recall and the best rule is the rule generated by the rule search process. However, any rule learning approach that follows the covering rule generation schema can be used here (i.e., search for the "best" rule, remove the data explained/covered by this rule, and repeat the search process).

Looking at 211 and 212, the rule 212 covers all of the positive and negative values, and rule 211 is empty. This rule set is then scored and compared to the base rule 201. The best rule is stored.

Next, the algorithm increments the x-axis split between the rules, creating rules 231 and 232. The rules are scored and compared to the previous best rule.

The process is repeated until all but one increment on the x-axis is left. These rules 241, 242 are then scored, compared, and stored if the score is better.

Once the x-axis has been searched, the best rules are then split on the y-axis (for example, 251,252) to find the best overall rule. This process may be repeated for as many axes as found in the data.

In the Distributed DensiCube algorithm, the functions shown in FIG. 2 are performed independently on multiple data silos operating on the different features that reside on those silos.

Figure 3:
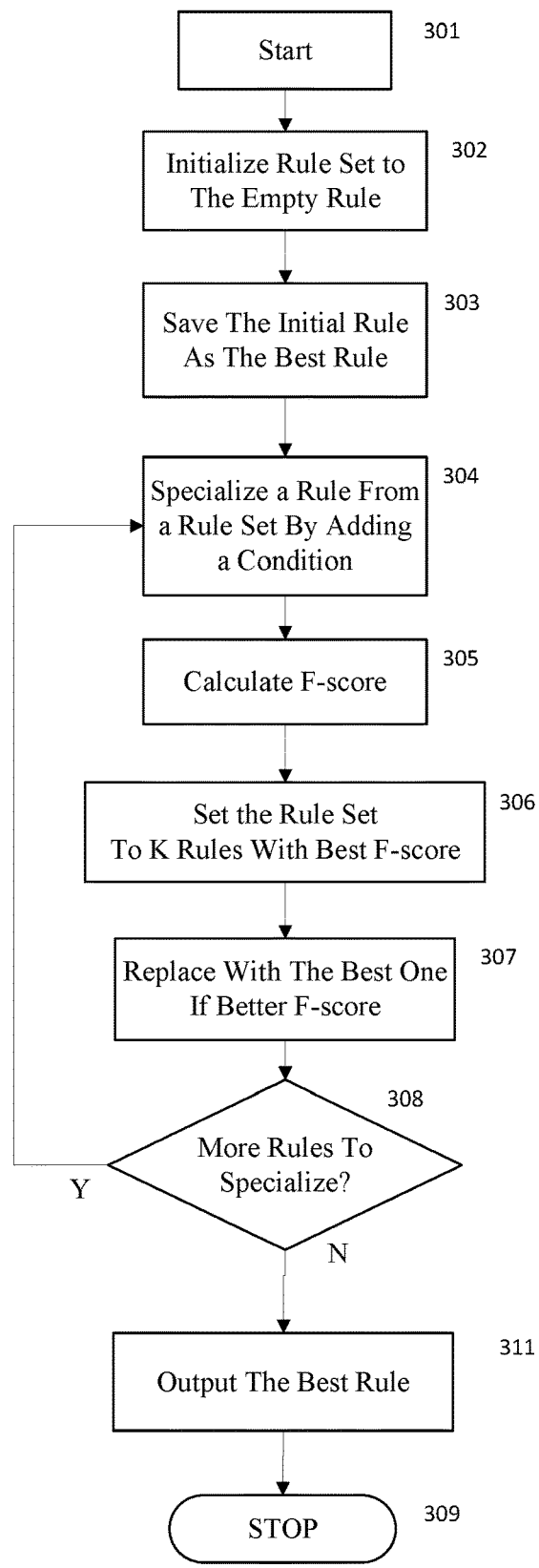
FIG. 3 is a flow chart of rule specialization and evaluation.

FIG. 3 depicts the internal process of generating a singular rule. It starts 301 with the step of initializing the risk model with a rule that describes the whole representation space 302 (i.e., a rule with conditional parts satisfying all attribute values). The initial rule is stored as the best rule 303. This rule is iteratively specialized via a k-beam search process of re-referencing its value ranges for each of the attributes 304. The specialization includes calculating the F-score 305, setting the rule set to the K rules with the best F-score 306, and replacing the Best Rule if this rule has the better F-Score 307. This continues while there are more rules to specialize 308. If not, the algorithm outputs the Best Rule 311 and stops 309. The top k rules, based on the evaluation measure, are maintained on the candidate list 405 during this process. All the rules on the candidate list 405 are evaluated and ranked. The best rule from the candidate rule list (i.e., an internal rule set maintained by the beam search algorithm) enters the model rule list (FIG. 4).

In the Distributed DensiCube algorithm, the entire process described in FIG. 3 is distributed and performed on each data silo.

Figure 4:
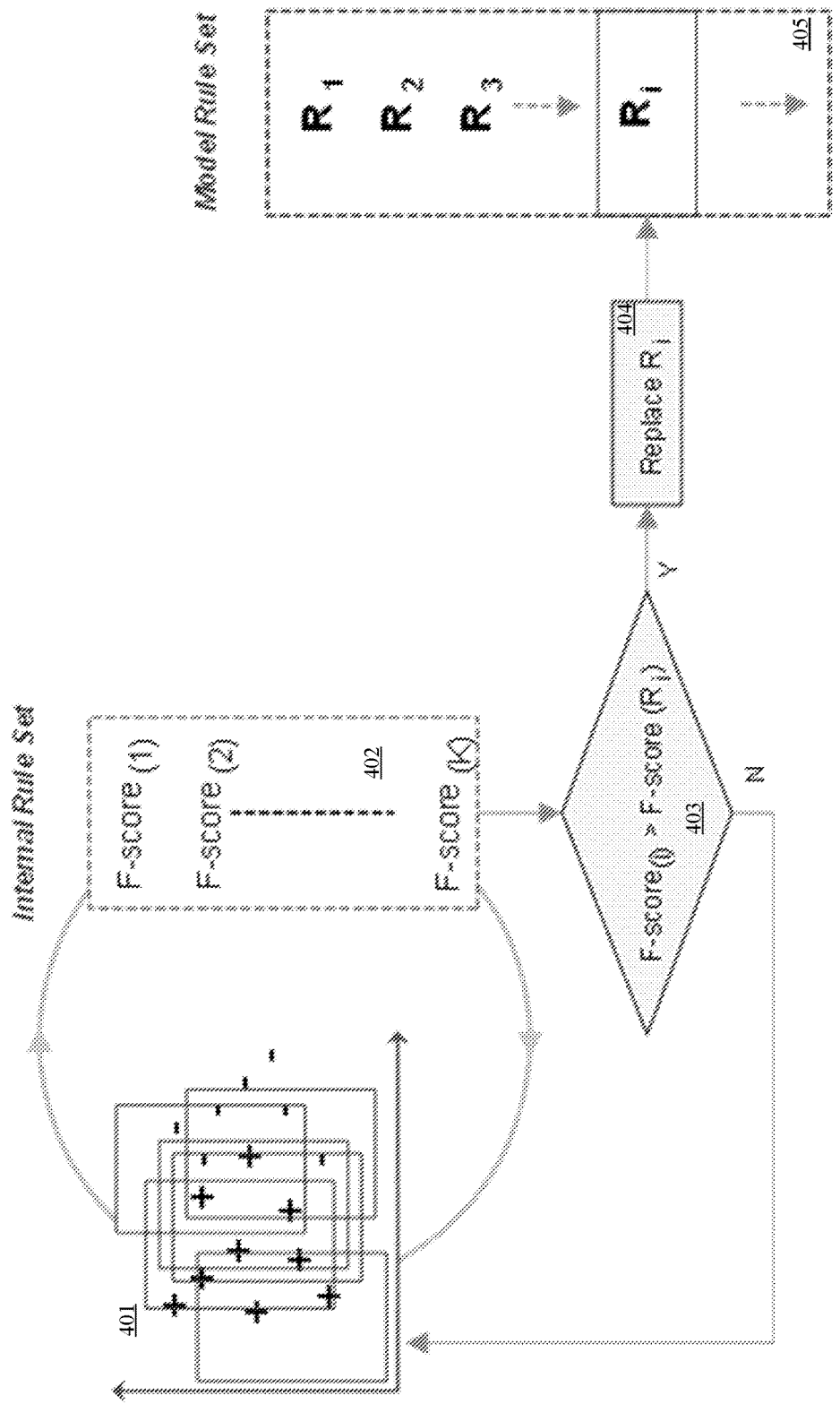
FIG. 4 illustrates a rule generation process with the internal rule list and the final model rule list.

Looking at FIG. 4, the rule 401 is analyzed and the F-scores of each sub-rule are recorded in the internal rule set 402. If the F-score 402 for the rule 401 is greater than the last F-score 403, then the last rule is replaced by the new rule 404. Various algorithms could be reserved here, for instance, the rule set could be a sorted list of pairs of the rule set and the rule's F-score. Also, the statistics of other machine learning quality measures could be used. When comparing 403, the list is searched and the new rule inserted 404, dropping off the lowest scoring rule set.

Every rule induction algorithm uses a metric to evaluate or rank the rules that it generates. Most rule induction algorithms use accuracy as the metric. However, accuracy is not a good metric for imbalanced data sets. The algorithm uses an F-measure as the evaluation metric. It selects the rule with the largest F-measure score. F-measure is widely used in information retrieval and in some machine learning algorithms. The two components of F-measure are recall and precision. The recall of a target class rule is the ratio of the number of target class examples covered by the rule to the total number of target class examples. The precision of a target class (i.e., misstatement class) rule is the ratio of the number of target class examples covered by the rule to the total number of examples (from both the target and non-target classes) covered by that rule. F-measure of a rule r is defined as:

$$F-\text{measure}(r) = \frac{\beta^2 + 1}{\frac{\beta^2}{\text{recall}(r)} + \frac{1}{\text{precision}(r)}}$$

where $\beta$ is the weight. When $\beta$ is set to 1, recall and precision are weighted equally. F-measure favors recall with $\beta > 1$ and favors precision with $\beta < 1$. F-measure can be used to compare the performances of two different models/rules. A model/rule with a larger F-measure is better than a model/rule with a smaller F-measure.

Prototype Generation Algorithm for Ranking with Rules

The algorithms incorporate a method, called prototype generation, to facilitate ranking with rules. For each rule generated by the rule learning algorithm, two prototypes are created. In generating prototypes, the software ignores symbolic conditions, because examples covered by a rule share the same symbolic values. Given a rule R with m numeric conditions: $A_{R1}=V_{R1} \wedge A_{R2}=V_{R2} \wedge \ldots \wedge A_{Rm}=V_{Rm}$, where $A_{Ri}$ is a numeric attribute and $V_{Ri}$ is a range of numeric values, the positive prototype of R, $P(R)=(p_{R1}, p_{R2}, \ldots, p_{Rm})$ and the negative prototype of R $N(R)=(n_{R1}, n_{R2}, \ldots, n_{Rm})$, where both $p_{Ri} \in V_{Ri}$ and $n_{Ri} \in V_{R1}$. $p_{Ri}$ and $n_{Ri}$ are computed using the following formulas:

$$p_{Ri} = \frac{\sum_{e \in R(POS)} e_{Ri}}{|R(POS)|} \text{ and } n_{Ri} = \frac{\sum_{e \in R(NEG)} e_{Ri}}{|R(NEG)|},$$

where R(POS) and R(NEG) are the sets of positive and negative examples covered by R respectively, $e=(e_{R1}, e_{R2}, \ldots, e_{Rm})$ is an example, and $e_{Ri} \in V_{R1}$ for $i=1, \ldots, m$, because e is covered by R.

Given a positive prototype $P(R)=(p_{R1}, p_{R2}, \ldots, p_{Rm})$ and a negative prototype $N(R)=(n_{R1}, n_{R2}, \ldots, n_{Rm})$ of rule R, the score of an example $e=(e_{R1}, e_{R2}, e_{Rm})$ is 0 if e is not covered by R. Otherwise, e receives a score between 0 and 1 computed using the following formula:

$$\text{score}(e, R) = \frac{\sum_{i=1}^{m} w_{Ri} \frac{|e_{Ri} - n_{Ri}| - |e_{Ri} - P_{Ri}|}{|p_{Ri} - n_{Ri}|} + \sum_{i=1}^{m} w_{Ri}}{2 \times \sum_{i=1}^{m} w_{Ri}}$$

where $w_{Ri}$ is the weight of $Ri^{th}$ attribute of R. The value of $$\frac{|e_{Ri} - n_{Ri}| - |e_{Ri} - p_{Ri}|}{|p_{Ri} - n_{Ri}|}$$

is between −1 and 1. When $e_{Ri} > n_{Ri} > p_{Ri}$ or $p_{Ri} > n_{Ri} > e_{Ri}$ it is −1. When $e_{Ri} > p_{Ri} > n_{Ri}$ or $n_{Ri} > p_{Ri} > e_R$, it is 1. When $e_{Ri}$ is closer to $n_{Ri}$ than $p_{Ri}$, it takes a value between −1 and 0. When $e_{Ri}$ is closer to $p_{Ri}$ than $n_{Ri}$, it takes a value between 0 and 1. The value of score(e, R) is normalized to the range of 0 and 1. If $p_{Ri} = n_{Ri}$, then $$\frac{|e_{Ri} - n_{Ri}| - |e_{Ri} - p_{Ri}|}{|p_{Ri} - n_{Ri}|}$$

is set to 0.

$w_{R1}$ is computed using the following formula.

$$w_{Ri} = \frac{|p_{Ri} - n_{Ri}|}{\max_{Ri} - \min_{Ri}},$$

where $\max_{Ri}$ and $\min_{Ri}$ are the maximum and minimum values of the $Ri^{th}$ attribute of R, respectively. The large difference between $p_{Ri}$ and $n_{Ri}$ implies that the values of positive examples are very different from the values of negative examples on the $Ri^{th}$ attribute, so the attribute should distinguish positive examples from negative ones as well.

Scoring Using Rules

A rule induction algorithm usually generates a set of overlapped rules. Two methods, Max and Probabilistic Sum, for combining example scores of multiple rules are used by the software. Both methods have been used in rule-based expert systems. The max approach simply takes the largest score of all rules. Given an example e and a set of n rules $R=\{R_1, \ldots, R_n,\}$, the combined score of e using Max is computed as follows:

$$\text{score}(e,R) = \max_{i=1}^{n}\{\text{Precision }(Ri) \times \text{score}(e,R)\},$$

where precision($R_i$) is the precision of $R_i$. There are two ways to determine score($e,R_i$) for a hybrid rule. The first way returns the score of e received from rule $R_i$ for all e's. The second way returns the score of e received from $R_i$ only if the score is larger than or equal to the threshold of $R_i$, otherwise, the score is 0. The first way returns. For a normal rule, $$\text{score}(e, R_i) = \begin{cases} 1 & \text{if } e \text{ is covered by } R_i \\ 0 & \text{Otherwise} \end{cases}$$

For the probabilistic sum method, the formula can be defined recursively as follows.

score(e,{R_1})=score(e,R_1)

score(e,{R_1,R_2})=score(e,R_1)+score(e,R_2)−score(e, R_1)×score(e,R_2)

score(e,{R_1, . . . , R_n})=score(e,{R_1, . . . , R_{n−1}})+ score(e,R_n)−score(e,{R_1, . . . , R_{n−1}})×score(e, R_n)

Hardware Architecture

Figure 5:
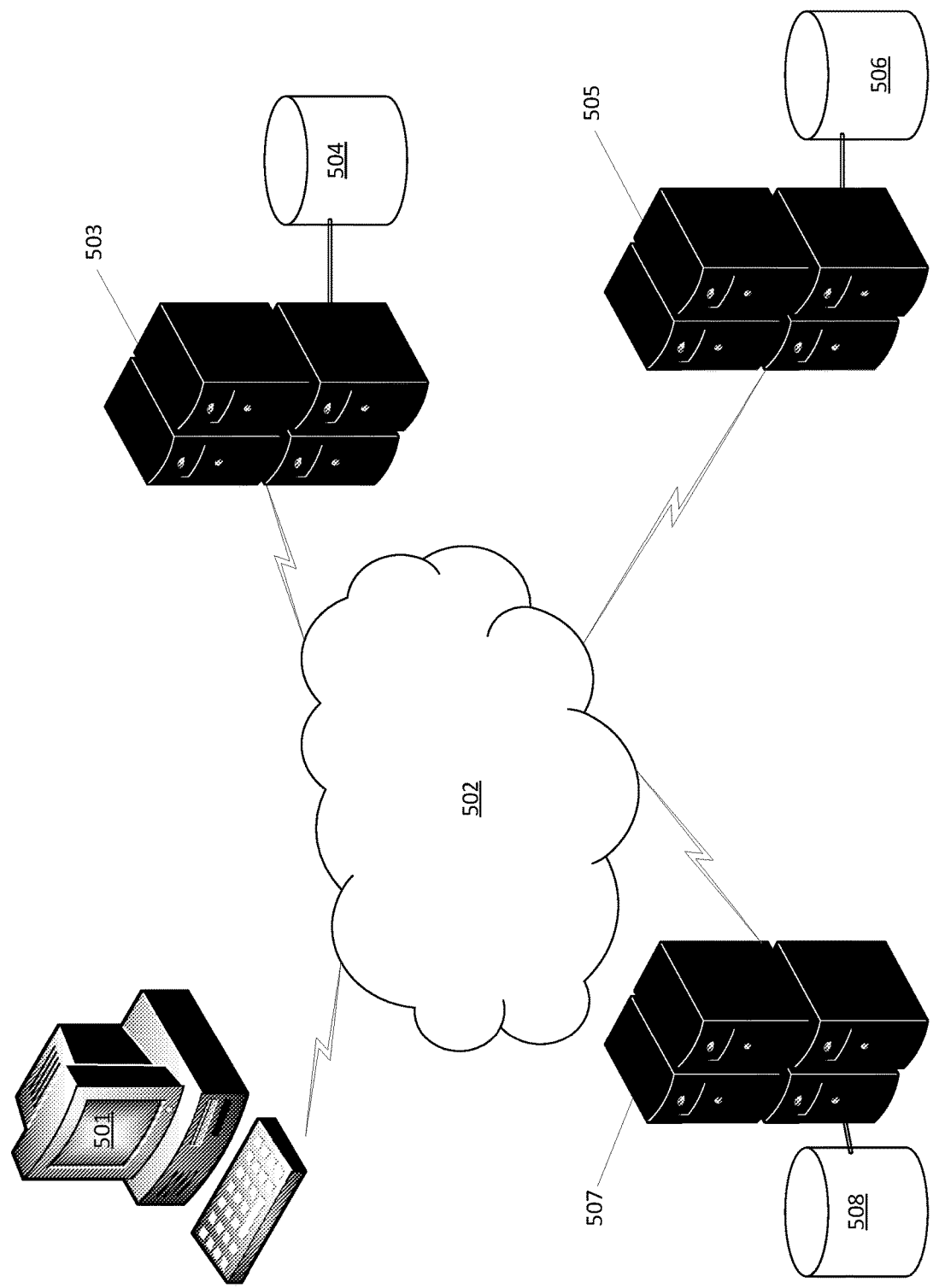
FIG. 5 is an electrical architecture of one embodiment.
Figure 6A:
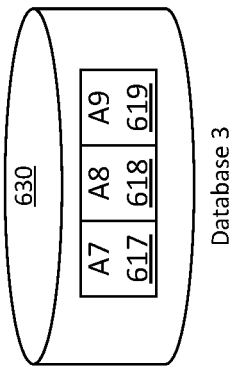
FIG. 6A is a diagram showing the horizontal fragmentation of the data across multiple sites.
Figure 6A:
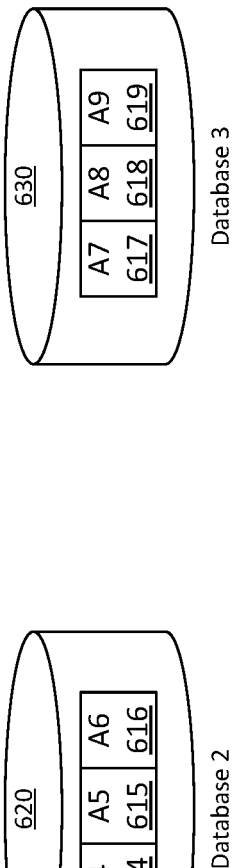
Figure 6A:
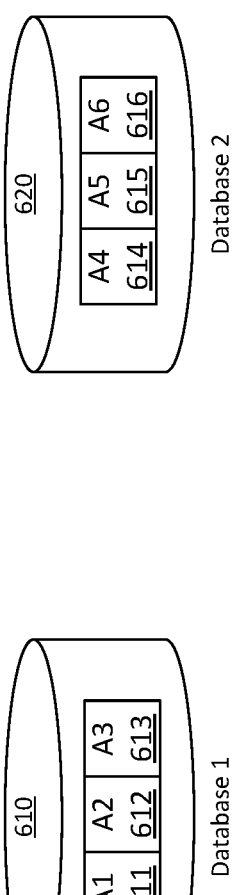
Figure 6B:
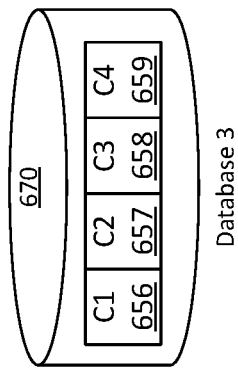
FIG. 6B shows a diagram showing the vertical fragmentation of attributes across multiple sites. entities.
Figure 6B:
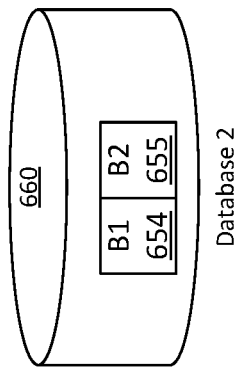
Figure 6B:
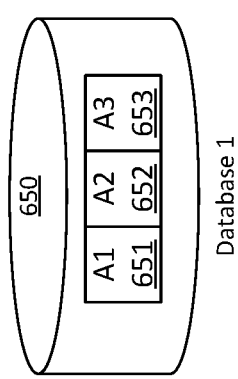

Turning to FIG. 5, we see a hardware architecture for implementing the distributed DensiCube algorithms. At the center of the distributed architecture is the cloud 502, which could be implemented as any type of network, from the Internet to a local area network or similar. Off of the cloud 502 are three servers 503, 505, 507, although any number of servers could be connected to the cloud 502. Each server 503, 505, 507 have a storage facility 504, 506, 508. These storage facilities 504, 506, 508 hold the databases as seen in FIGS. 6A and 6B 610, 620, 630, 650, 660, 670. Personal computer 501 (a laptop, desktop, or server 1001) could operate the algorithms to combine the distributed rules or this combination could occur on any server 503, 505, 507. The servers 503, 505, 507 (or data silos 1002) are not ordinary computers as the servers must have the performance to handle the highly computationally intensive efforts to operate the DensiCube algorithm described above. In addition, for many datasets, the storage facilities 504, 506, 508 must be able to hold very large databases 610, 620, 630, 650, 660, 670.

Distributed DensiCube

By allowing for distributed execution, the Distributed DensiCube algorithm allows for a number of important benefits. First of all, the privacy of the data assets in the model generation and prediction modes of operation are preserved by keeping the data in its original location and limiting access to the specific data. Second, the cost of implementing complex ETL processes and data warehousing, in general, is reduced by eliminating the costs of transmission to and storage in a central location. Third, these inventions increase performance by allowing parallel execution of the DensiCube algorithm (i.e., executing the predictive analytics algorithms on distributed computing platforms). In addition, this distributed algorithm provides the capability for the Distributed DensiCube algorithm to provide unsupervised learning (e.g., fraud detection from distributed data sources). Finally, it allows predictive analytics solutions to operate and react in real-time on a low-level transactional streaming data representation without requiring data aggregation.

The Distributed DensiCube approach represents a paradigm shift moving from the currently predominant Data Centric approaches to predictive analytics, i.e., approaches that transform, integrate, and push data from distributed silos to predictive analytics agents, to the future Decision Centric (predictive analytics bot agent-based) approaches, i.e., approaches that push predictive analytics agents to the data locations and by collaborating support decision-making in the distributed data environments.

Essentially, the distributed DensiCube algorithm operates the Densicube algorithm on each server 503, 505, 507 analyzing the local data in the database 504, 506, 508. The best rule or best set of rules 405 from each server 503, 505, 507 is then combined into the best overall rule. In some embodiments, several servers could work together to derive a best rule, that is combined with another server.

Collaborating predictive analytics bot agents can facilitate numerous opportunities for enterprise data warehousing to provide faster, more predictive, more prescriptive, and time and cost-saving decision-making solutions for their customers.

1.0 Distributed DensiCube Concept of Operation

The following sections describe the concept behind the Distributed DesiCube approach. As mentioned in the previous section, the Distributed DensiCube solution continues to use the same modeling algorithms as the current non-distributed predictive analytics solution (with modifications to the scoring algorithms to support privacy by preserving the data assets in silos).

1.1 Distributed Modeling

The Distributed DensiCube operates on distributed entities at different logical and/or physical locations.

The distributed entity represents a unified virtual feature vector describing an event (e.g., financial transaction, customer campaign information). Feature subsets 704, 705 of this representation are registered/linked by a common identifier (e.g., transaction ID, Enrolment Code, Invoice ID, etc.) 707. Thus, a distributed data 701 represents a virtual table 706 of joined feature subsets 704, 705 by their common identifier 707 (see FIG. 7).

Figure 7:
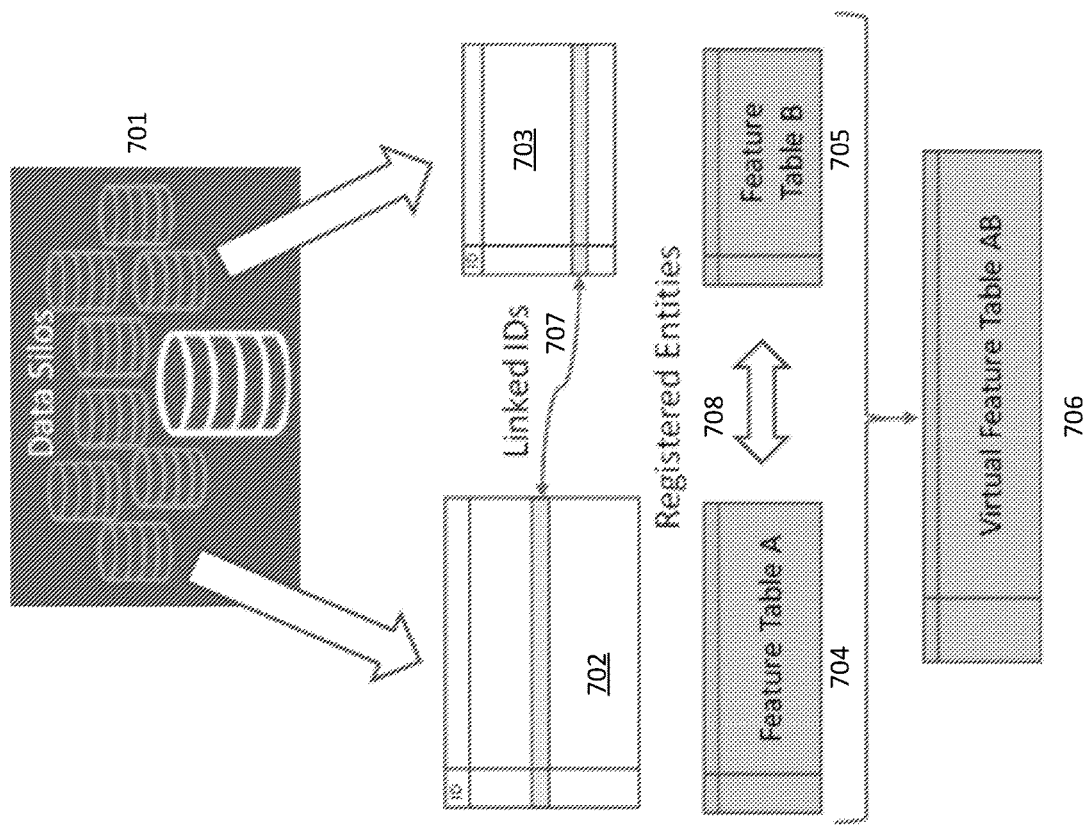
FIG. 7 is a view of a virtual feature table showing the distributed

In FIG. 7, there are a number of data silos 701 located at distributed locations across a network. Two of these data sets 702, 703 are called out in FIG. 7, although any number of data sets could be used. The data sets 702, 703 are essentially tables in some embodiments, each with an identifier column. These identifiers provide a link 707 between records in the two data sets 702, 703. In most, but not all, embodiments, there is a one-to-one correspondence between the records in the data sets 702, 703. The records in the data sets 702, 703 include feature tables 704, 705 of the registered entities 708 (registered records of the data sets 702, 703). These feature tables 704, 705 are virtually combined into a virtual feature table 706.

As an example of the distributed DensiCube algorithm, see FIG. 8. In this figure, there is an identifier 801 that is a social security number (SSN). The identifier 801 is used in each of the three databases 802, 803, 804. In this simplified example, the bank database 802 contains three fields, the ID (SSN), the Default field, and the amount borrowed. The Default field is negative if the loan is in default and positive if the loan is current.

Figure 9B:
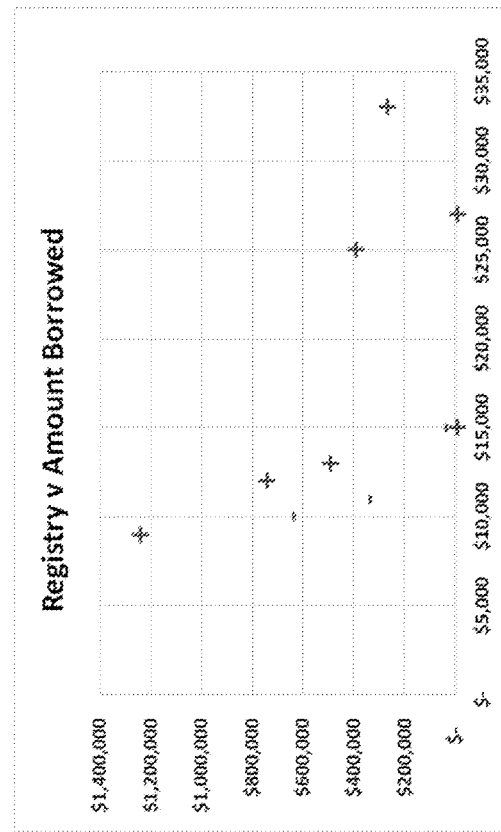
FIG. 9B is a graphical view of the data from FIG. 8 from two of the servers.
Figure 9A:
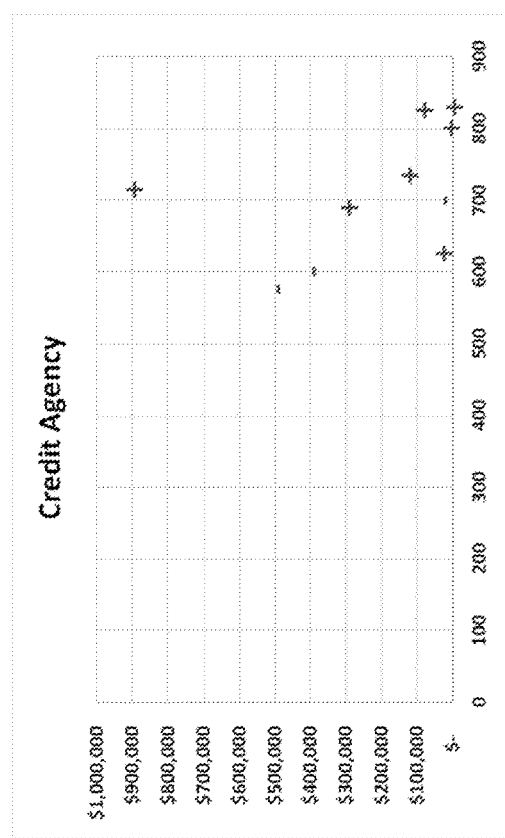
FIG. 9A is a graphical view of the data from FIG. 8 from one of the servers.

The credit agency database 803 contains three fields, the ID(SSN), the Credit Score, and the Total Debt fields. The registry of deeds database 804 also has three fields in this example, the ID(SSN), a home ownership field, and a home value field. In our example, there are a number of reasons that the data in the credit agency 803 needs to be kept separate from the registry data 804, and both of those datasets need to be kept separate from the bank data 802. As a result, the DensiCube algorithm is run three times on each of the databases 802, 803, 804. In another embodiment, two of the servers could be combined, with the algorithm running on one of the servers. This embodiment is seen in FIG. 9B, where the registry data 804 is combined with the bank information 803 to create a scatter diagram to perform the DensiCube algorithm upon. In FIG. 9A, the data from the credit agency database 803 is diagramed independently from the other datasets. The DensiCube algorithm is then run on this scatter diagram.

Figure 10:
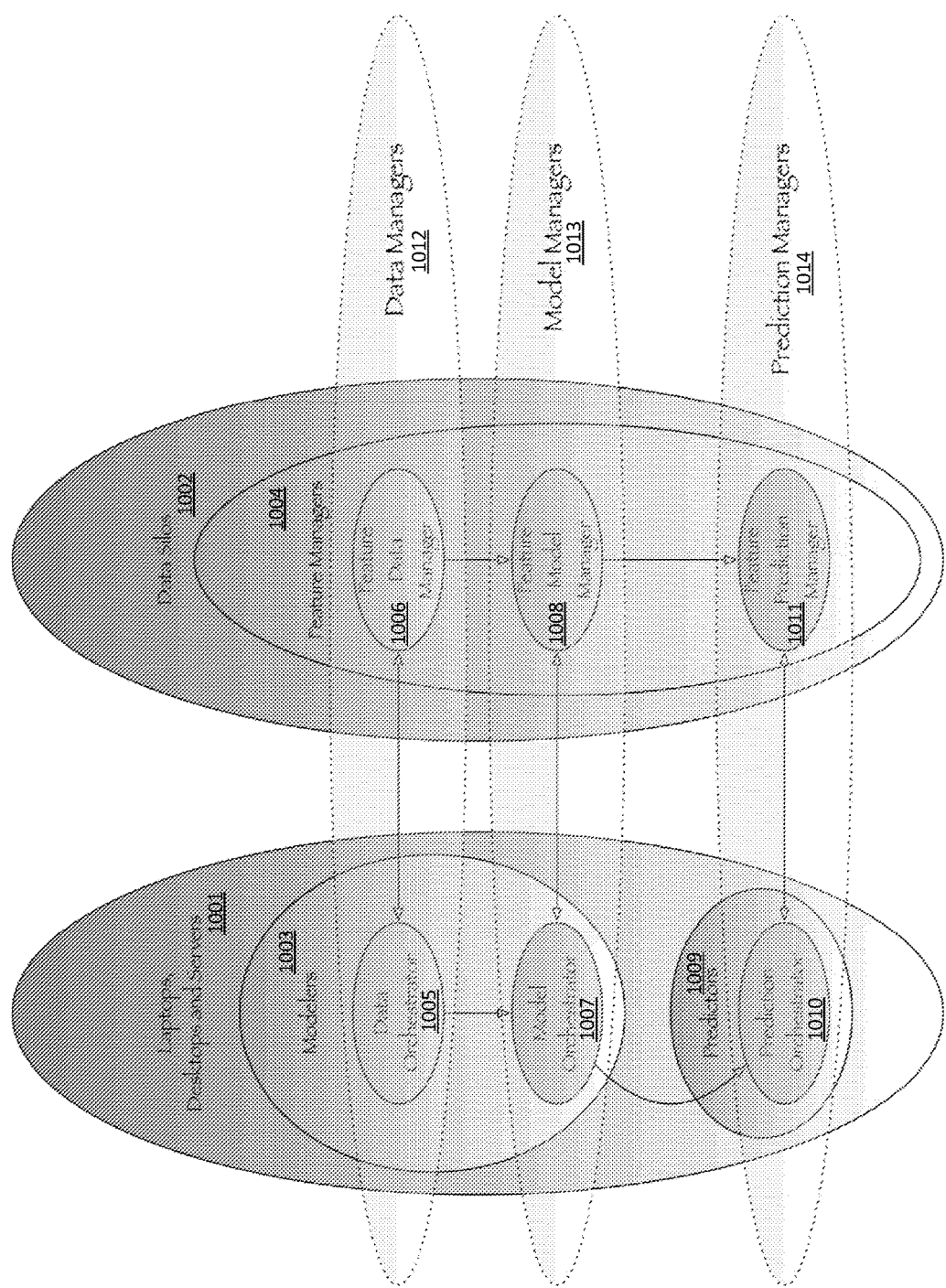
FIG. 10 illustrates the communication between the Distributed DensiCube components.

As seen in FIG. 10, the Distributed DensiCube is accomplished via a synchronized collaboration of the following components, operating on the laptops, desktops, or servers 1001 (see also 501 in FIG. 5) and the plurality of data silos 1002 (see also 503-508 in FIG. 5):

Modeler 1003 on the servers 1001
Feature managers 1004 on multiple data silos 1002
Predictors 1009 on the servers 1001

All the above components collaborate to generate models and use them for scoring, and at the same time, preserve the privacy of the data silos 1002. There are three levels of privacy that are possible in this set of inventions. The first level could preserve the data in the silos, providing privacy only for the individual data records. A second embodiment preserves the attributes of the data in the silos, preventing the model from knowing the attributes. The second embodiment may also hide the features (names of attributes) by instead returning a pseudonym for the features. In the third embodiment, the features themselves are kept hidden in the silos. For example, in the first level, the range of the credit scores is between 575 and 829 is reported back to the modeler 1003, but the individual record is kept hidden. In the second embodiment, the modeler 1003 is told that credit scores are used, but the range is kept hidden on the data silo 1002. In the third embodiment, the credit score feature itself is kept hidden from the modeler 1003. In this third embodiment, the model itself is distributed on each data silo, and the core modeler 1003 has no knowledge of the rules used on each data silo 1002.

The collaboration between distributed components results in a set of rules generated through a rule-based induction algorithm. The DensiCube induction algorithm, in an iterative fashion, determines the data partitions based on the feature rule based on the syntactic representation (e.g., if feature F>20 and F<−25). It dichotomizes (splits) the data into partitions. Each partition is evaluated by computing statistical quality measures. Specifically, the DensiCube uses an F-Score measure to compute the predictive quality of a specific partition. In binary classification, the F-score measure is a measure of a test's accuracy and is defined as the weighted harmonic mean of the test's precision and recall, Precision (also called positive predictive value) is the fraction of relevant instances among the retrieved instances, while Recall (also known as sensitivity) is the fraction of relevant instances that have been retrieved over the total amount of instances.

Specifically, the following steps are executed by Distributed DensiCube:

1) The modeler 1003 invokes feature managers 1004 that subsequently start data partitioning based on the local set of features at the data silo 1002. This process is called specialization.

2) Feature managers 1004 push their computed partitions (i.e., using the data identifier as the partition identifier) and their corresponding evaluation measures (e.g., F-score) to modelers 1003.

3) Each feature model manager 1008 compares evaluation measures of the sent partitions and selects the top N best partitions (i.e. specifically it establishes the global beam search for the top performing partitions and their combinations).

4) Subsequently, the modeler 1003 proceeds to the process of generating partition combinations. The first iteration of such combinations syntactically represents two-conditional rules (i.e., a partition is represented by a joint of lower and upper bounds of two features). Once this process is completed the identifiers of the two-conditional rules are sent to the feature managers 1004. Once received, feature managers 1004 evaluate the new partitions identified by the identifiers by executing the next iteration specialization.

A data manager 1012 is a logical construct which is comprised of a data orchestrator 1005 and one or more feature data managers 1006, which cooperate to manage data sets. Data sets can be used to create models and/or to make predictions using models. A data orchestrator 1005 is a component which provides services to maintain Data Sets, is identified by its host domain and port, and has a name which is not necessarily unique. A feature data manager 1006 is a component which provides services to maintain Feature Data Sets 1203, is identified by its host domain and port, and has a name which is not necessarily unique. A data set lives in a data orchestrator 1005, has a unique ID within the data orchestrator 1005, consists of a junction of Feature Data Sets 1203, joins Feature Data Sets 1203 on specified unique features, and is virtual tabular data (see FIG. 12). Each column 1206, 1207 is a feature from a Feature Data Set 1203. The columns also are associated with a feature data manager 1202. Each row is a junction of Events 1204 from each Feature Data Set 1203. The join feature attribute values 1205 are the joined feature attributes from each row and column. The entire junction is the table 1201.

A model manager 1013 is a logical construct which is comprised of a model orchestrator 1007 and one or more feature model managers 1008, which cooperate to generate models.

A prediction manager 1014 is a logical construct which is comprised of a prediction orchestrator 1010 and one or more feature prediction managers 1011, which cooperate to create scores and statistics (a.k.a. predictions).

1.2 Distributed Scoring

The distributed scoring process is accomplished in two steps. First, partial scores are calculated on each feature manager 1004 on each server. Then, complete scores are calculated from the partial scores.

The combined scores are the sum of the scores from each server divided by the sum of the weights from each server, multiplied by two:

$$\text{score}(e, R) = \frac{ScoreA + ScoreB}{2 \times \sum_{i=1}^{m} w_{Ri}}$$

In this formula, the score for servers A and B are similar to the DensiCube scoring described above.

$$ScoreA = \sum_{i=1}^{m} w_{Ri}\left(\frac{|e_{Ri} - n_{Ri}| - |e_{Ri} - p_{Ri}|}{|p_{Ri} - n_{Ri}|} + 1\right)$$

$$ScoreB = \sum_{i=1}^{m} w_{Ri}\left(\frac{|e_{Ri} - n_{Ri}| - |e_{Ri} - p_{Ri}|}{|p_{Ri} - n_{Ri}|} + 1\right)$$

The weights are also determined for each location, as above.

$$w_{Ri} = \frac{|p_{Ri} - n_{Ri}|}{\max_{Ri} - \min_{Ri}}$$

$$w_{Ri} = \frac{|p_{Ri} - n_{Ri}|}{\max_{Ri} - \min_{Ri}}$$

With the combined score, we have a metric to show the validity of the selected model.

2.0 Initial Architectural Concept of Operation and Requirements

2.1 Feature Manager 1004

At the initialization of the machine learning model generation process, each feature manager 1004 is set up on the local servers 1002. Each feature manager 1004 must be uniquely named (e.g., within the subnet where it lives). The port number where the feature manager 1004 can be reached needs to be defined. Access control needs to be configured, with a certificate for the feature manager 1004 installed and the public key for each modeler 1003 and feature prediction manager 1011 installed to allow access to this feature manager 1004. Each local feature manager 1004 needs to broadcast the name, host, port, and public key of the feature manager 1004. In some embodiments, the feature manager 1004 needs to listen to other broadcasts to verify uniqueness.

Figure 12:
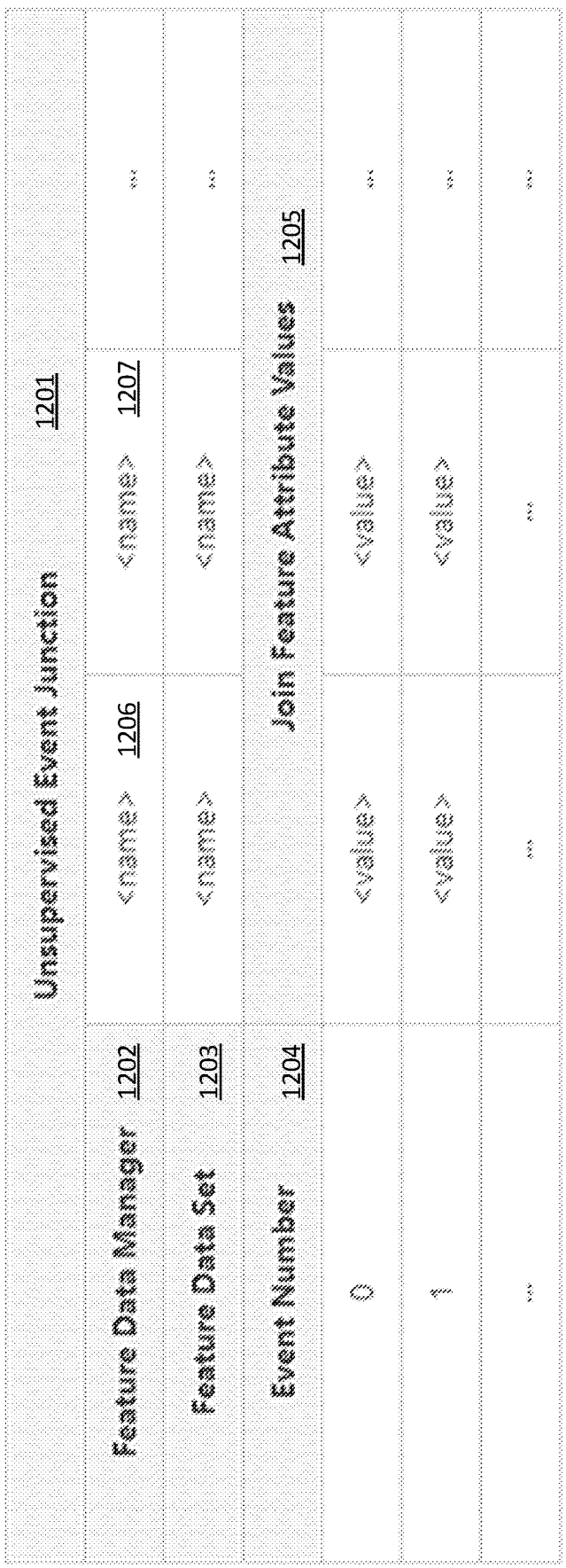
FIG. 12 is an overview of the distributed data structure upon which the distributed machine learning algorithm is performed.

Next, the data sources are defined. As seen in FIGS. 8 and 12, the data source is in tabular form (Rows & Columns). In another embodiment, a Relation Data Source is a collection of Data Tables which themselves contain tabular data. The important characteristic is to be able to define a Data Set Template which results in the Column definition of tabular data. Each Data Source must be uniquely identified by name within a feature manager 1004. Each Column must be uniquely identified by name within a Data Source. At least one Column in each Data Source must be unique and suitable for joining to other Data Sources. It must have meaning outside the Data Source such that the feature model managers 1008 can join the Data Source to other Data Sources.

Each Data Source shall be described by a name for the data source and a plurality of columns, where each column has a name, a data type, and a uniqueness field. Data Sources can be used by feature model managers 1008 or feature prediction managers 1011 or both. Data Sources are probably defined by calls from a modeler 1003.

The next step involves defining the Data Set Templates. A Data Set Template is a specification of how to join Data Sources defined within a feature data manager 1006. Each Data Set Template must be uniquely identified by name within a feature data manager 1006. A Data Set Template is a definition of Columns without regard to the Rows in each Data Source. For example, a Data Set Template could be represented by a SQL select statement with columns and join conditions, but without a where clause to limit rows. Data Set Templates can be used by feature model managers 1008 or feature prediction managers 1011 or both. Data Set Templates are probably defined by calls from a feature model manager 1008.

Once the Data Set Templates are set up, the next step is to define the Data Sets. A Data Set is tabular data which is a subset of a data from the Data Sources defined within a feature data manager 1006. Each Data Set must be uniquely identified by name within a feature data manager 1006. A Data Set is defined by a Data Set Template to define the columns and a set of filters to define the rows. For example, the filter could be the where clause in a SQL statement. Data Sets can be used by modelers 1003 or feature prediction managers 1011 or both. Data Sets are probably defined by calls from a modeler 1003.

2.2 Modeler 1003

In FIG. 10 the relationship between the modelers 1003, the predictors 1009, and the feature managers 1004.

In the setup of the model orchestrator 1007, each modeler 1003 should be uniquely named, at least within the subnet where it lives. However, in some embodiments, the uniqueness may not be enforceable. Next, the access control is configured by installing a certificate for the modeler 1003 and installing the public key for each feature manager 1004 containing pertinent data. The public key for each feature prediction manager 1011 is also installed, to which this modeler 1003 can publish.

Once set up, the model orchestrator 1007 establishes a connection to each feature model manager 1008.

Then the Model Data Set templates are defined. A Model Data Set Template is a conjunction of Data Set Templates from feature data managers 1006. Each Data Set Template must be uniquely named within the feature manager 1004. The Data Set Templates on feature data managers 1006 are defined, as are the join conditions. A join condition is an equality expression between unique columns on two Data Sets. For example <Feature Manager A>.<Data Set Template 1>.<Column a>=<Feature Manager B>.<Data Set Template 2>.<Column b>. Each data set participating in the model data set must be joined such that a singular virtual tabular data set is defined.

After the templates are defined, the model data sets themselves are defined. A Model Data Set is a conjunction of Data Sets from feature data managers 1006. The Model Data Set is a row filter applied to a Model Data Set Template. Each Data Set must be uniquely named within a Model Data Set Template. Then the data sets on the feature data managers 1006 are defined. This filters the rows.

Next, the Modeling Parameters are defined. Modeling Parameters define how a Model is created on any Model Data Set which is derived from a Model Data Set Template. Each Modeling Parameters definition must be unique within a Model Data Set Template.

Then, a model is created and published. A model is created by applying Modeling Parameters to a Model Data Set. Each Model must be uniquely identified by name within a Model Data Set. A Model can be published to a feature prediction manager 1011. Publishing will persist the Model artifacts in the feature model managers 1008 and feature prediction managers 1011. Following are some of the artifacts which will be persisted to either the feature data manager 1008 and/or feature prediction manager 1011: Data set templates, model data set templates, and the model.

2.3 Prediction Orchestrator 1010

The prediction orchestrator 1010 setup begins with the configuration of the access control. This is done by installing a certificate for the feature prediction manager 1011 and installing the public key for each modeler 1003 allowed to access this prediction orchestrator 1010. The public key for each feature manager 1004 containing pertinent data is also installed. Each prediction orchestrator 1010 should be uniquely named, but in some embodiments, this may not be enforced.

Next, a connection to each feature prediction manager 1011 is established and to a model orchestrator 1007. The model orchestrator 1007 will publish the Model Data Set Template and Model to the prediction orchestrator 1010.

The scoring data sets are then defined. A Scoring Data Set is a conjunction of Data Sets from the feature data managers 1006. It is a row filter applied to a Model Data Set Template. Each Data Set must be uniquely named within a Model Data Set Template. The data sets on the feature data managers 1006 are defined (this filters the rows).

Then the Scoring Parameters are defined. Scoring Parameters define how Scores are calculated on any Score Data Set which is derived from a Model Data Set Template. Each Scoring Parameters definition must be unique within a Model Data Set Template.

Finally, a Scoring Data Set is defined. Partial Scores are calculated on each feature manager 1004 in the feature prediction manager 1011. See FIG. 11A. Complete Scores are then calculated by the prediction orchestrator 1010 from the partial Scores. See FIG. 11B for the calculation combining the partial scores.

Figure 13:
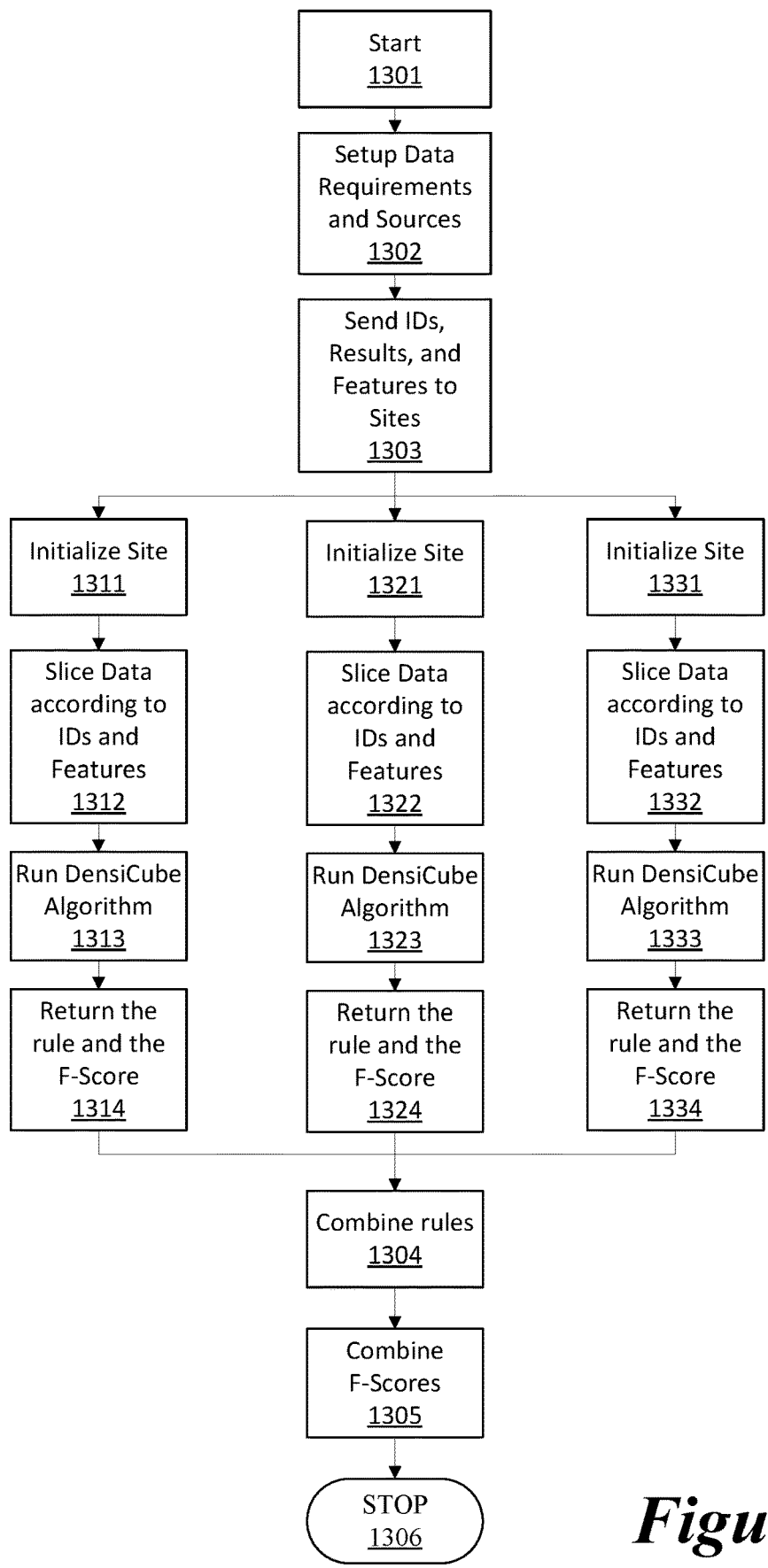
FIG. 13 is a flowchart showing the distributed nature of the Distributed DensiCube algorithm.

Looking at FIG. 13, we see the distributed nature of the Distributed DensiCube algorithm. The algorithm starts 1301 by initializing the software. The data requirements are set up, and the distributed sources of the data are identified 1302. Once the data features have been identified, a list of the IDs 801, the learning results (e.g. the Loan Results in 802), and perhaps the desired features (e.g. Amount Borrowed in 802, Credit Score and Total Debt in 803, Home Ownership and Home Value in 804) are sent 1303 to the data silos 1002. In some embodiments, the desired features are not sent, instead, the feature manager 1004 on the data silo 1002 determines the features. While the FIG. 8 embodiment has tri-state results (+, −, and blank), some embodiments only use two-state results ("+" or blank). In the two-state embodiment, there is no need to transmit the learning results; instead only a list of IDs is sent, with the implication that the IDs specified are the set of positive results.

The feature managers 1004 on each of the data silos 1002 then initialize the site 1311, 1321, 1331. The data on the silo 1002 is then sliced, using the list of IDs and the features 1312, 1322, 1332 into a data set of interest, by the feature data manager 1006. The DensiCube algorithm 1313, 1323, 1333 is then run by the feature model manager 1008 on the data of interest, as seen in FIGS. 2, 3, and 4. Once the DensiCube algorithm 1313, 1323, 1333 is complete, the rule and the F-score are finalized by the feature prediction managers 1011, the rule and F-Scores are returned 1314, 1324, 1334 to the prediction orchestrator 1010. In some embodiments, only the F-Scores are returned 1314, 1324, 1334, and the rules are maintained locally in the feature managers 1004.

Figure 11A:
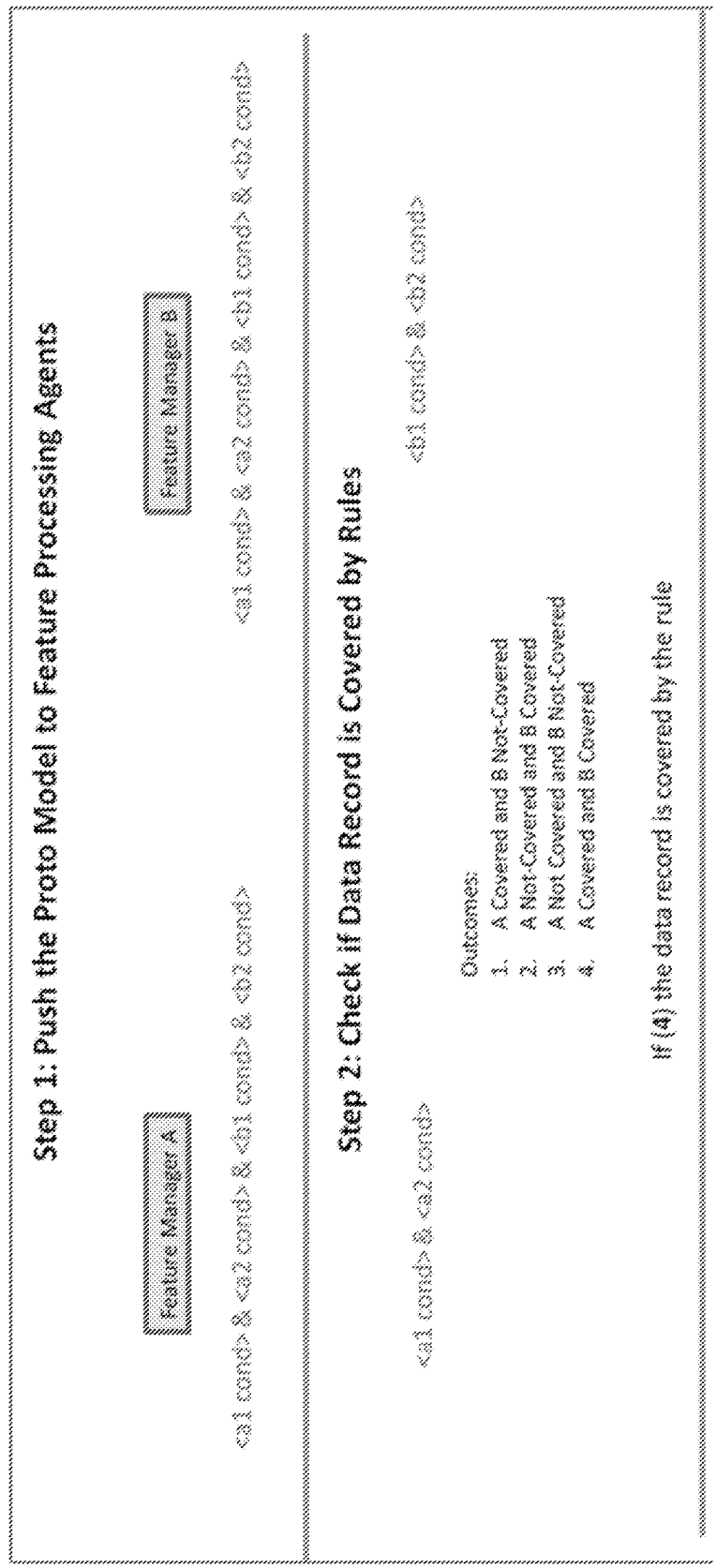
FIGS. 11A and 11B show modifications to the scoring algorithm to support privacy preservation in the data silos.
Figure 11B:
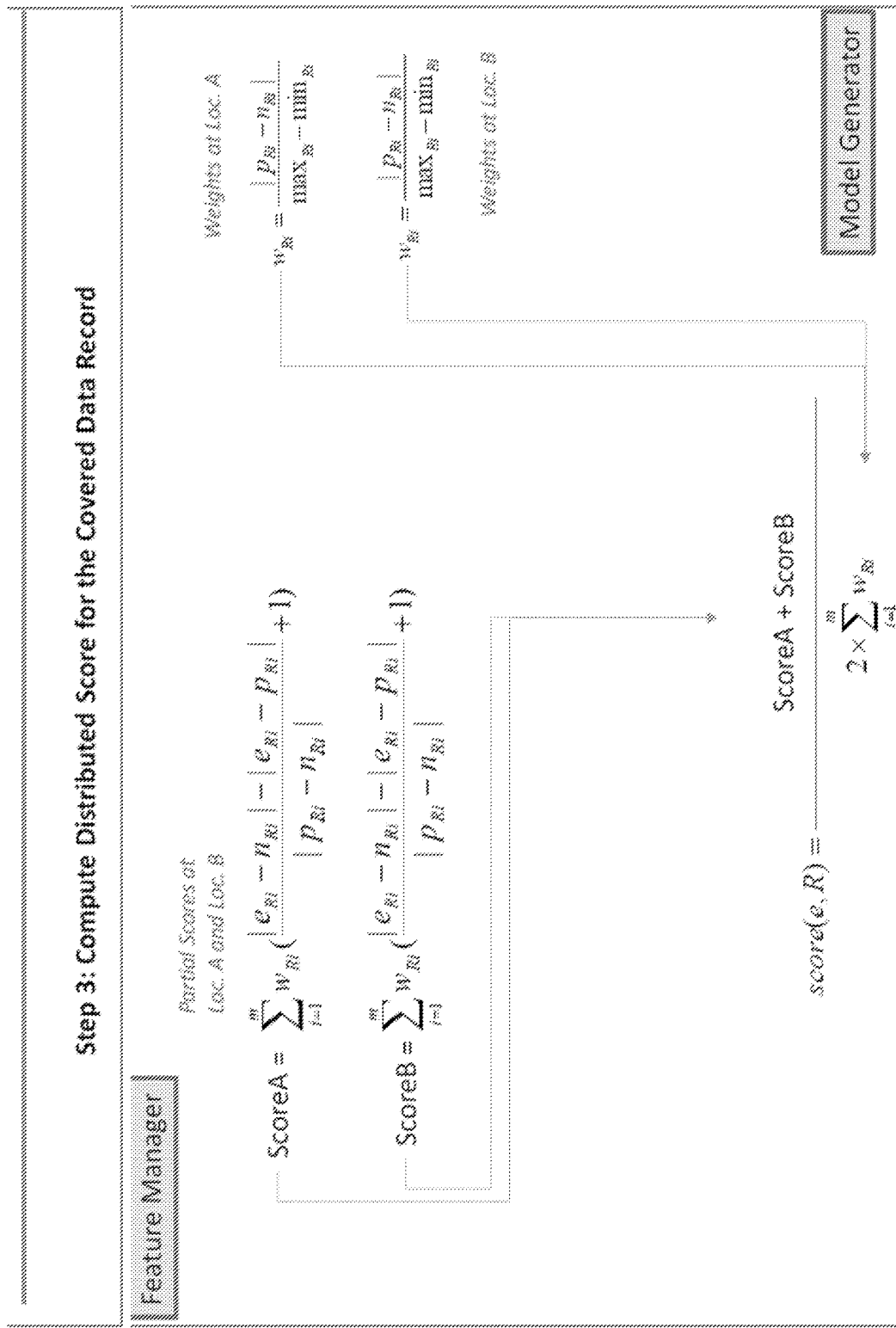

The rules, in some embodiments, are then returned to the prediction orchestrator 1010 where they are combined into an overall rule 1304, as seen in FIG. 11A. Next, the F-Scores are combined 1305 by the prediction orchestrator 1010 into an overall F-Score for the generated rule using the formulas in FIG. 11B. And the Distributed DensiCube algorithm is complete 1306.

Modifications to the scoring algorithms to support privacy preservation in the data silos.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A machine learning apparatus comprising:
a first data storage device including a first distributed data set;
a first network connector connected to a network, the first network connector in communications with a second network connector on a second data storage device on a machine learning server, the second data storage device including a second distributed data set;
a model orchestrator, stored in the first data storage device and executing on the machine learning apparatus, the model orchestrator programmed to publish a set of data identifiers including data elements and data features, and programmed to send the set of the data identifiers through the first network connector to the second network connector to a second prediction manager executing on the machine learning server;
a first prediction manager connected to the first data storage device programmed to receive the set of the data identifiers from the model orchestrator and to calculate a first quality control metric and a first rule set using a first machine learning algorithm on the first distributed data set;
a prediction orchestrator programmed to receive the first quality control metric and the first rule set from the first prediction manager and to receive from the second prediction manager a second quality control metric and a second rule set determined from the second distributed data set; and
the prediction orchestrator further programmed to combine the first rule set and the second rule set into a common rule set and to combine the first quality control metric and the second quality control metric into a combined quality control metric.

2. The machine learning apparatus of claim 1 further comprising a data set template, stored in the first data storage device, that contains a definition of the first distributed data set and the second distributed data set.

3. The machine learning apparatus of claim 2 wherein the model orchestrator publishes the data set template.

4. The machine learning apparatus of claim 1 wherein the combined quality control metric uses a weighted algorithm.

5. The machine learning apparatus of claim 1 wherein the combined quality control metric is an F-score.

6. The machine learning apparatus of claim 1 wherein the network is an Internet.

7. The machine learning apparatus of claim 1 wherein the network is a local area network.

8. The machine learning apparatus of claim 1 wherein the first machine learning algorithm creates a test rule by adding a condition, calculating a test quality metric, and saving the test rule and the test quality metric if the test quality metric is better than previously saved test quality metrics.

9. The machine learning apparatus of claim 8 wherein the condition is a range locating clusters of data.

10. The machine learning apparatus of claim 1 wherein the second distributed data set is kept private from the machine learning apparatus.

11. A machine learning method comprising:
connecting a machine learning apparatus, including a first distributed data set stored on a first data storage device with a second data storage device on a machine learning server, the second data storage device including a second distributed data set;
publishing, by a model orchestrator on the machine learning apparatus, a set of data identifiers including data elements and data features;
sending, by the model orchestrator, the set of the data identifiers to a second prediction manager on the machine learning server over a network;
receiving, by a first prediction manager on the machine learning apparatus, the set of the data identifiers from the model orchestrator;
calculating, by the first prediction manager, a first quality control metric and a first rule set using a first machine learning algorithm on the first distributed data set;
receiving, by a prediction orchestrator, the first quality control metric and the first rule set from the first prediction manager;
receiving, by the prediction orchestrator from the second prediction manager, a second quality control metric and a second rule set as determined from the second distributed data set;
combining, by the prediction orchestrator the first rule set and the second rule set into a common rule set; and
combining, by the prediction orchestrator, the first quality control metric and the second quality control metric into a combined quality control metric.

12. The machine learning method of claim 11 further comprising creating a data set template, stored in the first data storage device, that contains a definition of the first distributed data set and the second distributed data set.

13. The machine learning method of claim 12 further comprising publishing, by the model orchestrator, the data set template.

14. The machine learning method of claim 11 wherein the combined quality control metric uses a weighted algorithm.

15. The machine learning method of claim 11 wherein the combined quality control metric is an F-score.

16. The machine learning method of claim 11 wherein the network is an Internet.

17. The machine learning method of claim 11 wherein the network is a local area network.

18. The machine learning method of claim 11 further comprising creating, by the first machine learning algorithm, a test rule by adding a condition, calculating a test quality metric, and saving the test rule and the test quality metric if the test quality metric is better than previously saved test quality metrics.

19. The machine learning method of claim 18 wherein the condition is a range locating clusters of data.

20. The machine learning method of claim 11 wherein the second distributed data set is kept private from the machine learning apparatus.

* * * * *